(12) United States Patent
Beaulieu et al.

(10) Patent No.: US 8,654,899 B2
(45) Date of Patent: Feb. 18, 2014

(54) PILOT SYMBOL ASSISTED MODULATION SIGNAL PROCESSING SYSTEMS AND METHODS

(75) Inventors: Norman C. Beaulieu, Edmonton (CA); Yunfei Chen, Edmonton (CA)

(73) Assignee: The Governors of the University of Alberta, Edmonton, Alberta (CA)

( * ) Notice: Subject to any disclaimer, the term of this patent is extended or adjusted under 35 U.S.C. 154(b) by 917 days.

(21) Appl. No.: 11/665,188

(22) PCT Filed: Oct. 12, 2005

(86) PCT No.: PCT/CA2005/001551
§ 371 (c)(1),
(2), (4) Date: Sep. 8, 2008

(87) PCT Pub. No.: WO2006/039793
PCT Pub. Date: Apr. 20, 2006

(65) Prior Publication Data
US 2009/0034659 A1 Feb. 5, 2009

Related U.S. Application Data

(60) Provisional application No. 60/617,043, filed on Oct. 12, 2004.

(51) Int. Cl.
*H03D 1/00* (2006.01)
(52) U.S. Cl.
USPC .......................................................... 375/340
(58) Field of Classification Search
USPC .......................................................... 375/340
See application file for complete search history.

(56) References Cited

U.S. PATENT DOCUMENTS

| 5,414,734 | A | * | 5/1995 | Marchetto et al. | ............ 375/267 |
| 2002/0034161 | A1 | | 3/2002 | Deneire et al. | |
| 2003/0147476 | A1 | | 8/2003 | Ma et al. | |
| 2006/0023653 | A1 | * | 2/2006 | Montalbano | .................. 370/315 |

FOREIGN PATENT DOCUMENTS

| EP | 0605955 | 1/2001 |
| WO | WO 0158027 | 8/2001 |

OTHER PUBLICATIONS

J.K. Cavers, "An analysis of pilot symbol assisted modulation for Rayleigh fading channels", IEEE Trans. Vehicul. Technol., vol. 40, pp. 686-693, Nov. 1991.
Y. Chen et al., "Estimators using noisy channel samples for fading distribution parameters", submitted.

(Continued)

*Primary Examiner* — Michael Neff

(57) ABSTRACT

Pilot symbol assisted modulation (PSAM) techniques for Rayleigh and Rician fading channels are derived. Previous techniques implement PSAM signal detectors as an ad-hoc design, using pilot symbols to first estimate channel gain, and then using channel gain estimates in a conventional coherent detector to make data decisions. Although this structure may be effective for binary phase shift keying in Rayleigh fading, it is suboptimal for Rician fading and for 16-ary quadrature amplitude modulation in Rayleigh fading. According to techniques disclosed herein, a PSAM signal detector jointly processes pilot symbols and data symbols. The performance of signal detectors according to embodiments of the invention is analyzed and compared with that of conventional detectors. Numerical results are presented to show that the performance gain of a proposed new PSAM signal detector over conventional PSAM detectors can be as much as 2 or 3 dB for Rician fading in some cases.

15 Claims, 9 Drawing Sheets

(56) References Cited

OTHER PUBLICATIONS

H. Li et al., "Symbol error rate analysis for MPSK under Rician fading channels with fading compensation based on time correlation", IEEE Trans. Vehicul. Technol., vol. 44, pp. 535-542, Aug. 1995.

J.G. Proakis, Digital Communications, 4th ed. New York: McGraw-Hill, 2001.

B. Noble, Applied Linear Algebra, Engle Cliff, NJ: Prentice-Hall, 1969.

S. Sampei et al., "Rayleigh fading compensation for QAM in land mobile radio communications", IEEE Trans. Vehicul. Technol., vol. 42, pp. 137-147, May 1993.

G.L. Stüber, Principles of Mobile Commuincation, 2nd ed. Norwell, MA: Kluwer Academic, 2001.

S.S. Wilks, Mathematical Statistics, New York: John Wiley & Sons, 1962.

Chen, Yunfei; Beaulieu, Norman C.; "Optimum Pilot Symbol Assisted Modulation", IEEE Transactions on Communications, vol. 55, No. 8, Aug. 2007, pp. 1536-1545.

* cited by examiner

PILOT SYMBOL ASSISTED MODULATION SIGNAL PROCESSING SYSTEMS AND METHODS

This application is the National Phase of International Application No. PCT/CA2005/001551 filed on Oct. 12, 2005, which claims the benefit of priority of U.S. Provisional application No. 60/617,043 filed on Oct. 12, 2004, which documents are both incorporated herein by reference in their entirety.

FIELD OF THE INVENTION

The invention relates generally to communications, and in particular to pilot symbol assisted modulation techniques.

BACKGROUND OF THE INVENTION

Many wireless communication techniques and components require knowledge of channel state to achieve their optimal performances. In practice, this knowledge is often acquired by estimation. The estimation can be performed blindly by using unknown data symbols only [1]. More frequently, it is performed with the aid of some known symbols. If the channel is fading slowly enough such that the channel parameters remain approximately constant over a relatively long period of time, a training sequence can be used since the channel parameters estimated during the training period are valid for the following data transmission as well. In some practical wireless communication systems, this slow fading condition is not satisfied. In this case, pilot symbols that are interspersed with data symbols are used in conjunction with interpolation, and the channel parameter estimation has to be performed for each individual data symbol. Pilot symbol assisted modulation (PSAM) was proposed to detect signals in fast fading channels in [2]-[4].

A conventional PSAM (CPSAM) system is implemented by periodically inserting pilot symbols known to a receiver into a data sequence. After transmission over the fading channel with the data symbols, these pilot symbols are separated from the received signals and applied to a channel estimator. The channel estimator uses these pilot symbols to generate a channel gain estimate. The channel gain may have changed from the pilot symbol time instant to the data symbol time instant. Therefore, the channel gain is estimated using multiple pilot symbols and an interpolation filter. The interpolated channel gain estimates at the time instants of the data symbols are valid due to the time correlation of the fading. The channel gain estimate is used in a conventional coherent signal detector to make a data decision. It has been shown [2]-[4] that this detector is effective in combating fast fading.

In this conventional detector, estimation of the channel gain and detection of the data symbol have actually been split into two separate operations. One first obtains the channel gain estimate using the pilot symbols, and then uses this estimate in the coherent signal detector to make the data decision. Note that the optimality of the coherent signal detector is only valid under the assumption of perfect channel state information. Note further that the use of the CPSAM signal detector is essentially an intuitive realization of the coherent signal detector when the channel state information is not perfectly known.

Thus, there remains a need for improved PSAM techniques.

SUMMARY OF THE INVENTION

PSAM receivers, illustratively for Rayleigh and Rician fading channels, are provided.

According to one broad aspect, the invention provides an apparatus having an input for receiving from a communication channel a communication signal containing unknown data symbols and known pilot symbols and a communication signal processing module operatively coupled to the input and configured to determine a transmitted value of a received data symbol based on at least one pilot symbol in the received communication signal, a received value of at least one data symbol, and a likelihood function, the likelihood function taking into account an assumption of a fading process on the communication channel and a specular component of the fading process.

In some embodiments, the communication signal processing module is configured to determine a transmitted value of a received data symbol by selecting from a plurality of possible values of the data symbol a value that maximizes the likelihood function.

In some embodiments, the communication signal processing module is configured to determine a transmitted value of a received data symbol by computing a respective intermediate value for each of a plurality of possible values of the data symbol and determining a respective likelihood value for each possible value of the data symbol, the respective likelihood values being a function of a received value of the data symbol and the respective intermediate values.

In some embodiments, each intermediate value is representative of an estimate of a gain of the communication channel, and the communication signal processor is further configured to select as a channel gain estimate for the received data symbol a channel gain estimate associated with a highest of the respective likelihood values.

In some embodiments, the apparatus also includes an output operatively coupled to the communication signal processor, and the communication signal processor is further configured to provide at the output at least one of the determined transmitted value of the received data symbol and the channel gain estimate for the received data symbol.

In some embodiments, the apparatus includes a plurality of antennas for receiving diversity components of the communication signal, and a diversity combiner that is operatively coupled to the plurality of antennas and to the input, and configured to combine the received diversity components to generate the received communication signal.

In some embodiments, the communication signal processor is configured to provide at the output the channel gain estimate for the received data symbol, and the diversity combiner is further operatively coupled to the output and configured to use the channel gain estimate in combining other received diversity components.

In some embodiments, the fading process is a Rician fading process, the likelihood function is $$f(r_k, p|b_k) = \iiint f(r_k, p|u_k, v, b_k) \cdot f(u_k, v) du_k dv,$$

the data symbol has one of a plurality of possible values having equal energies, and the communication signal processing module is configured to determine a transmitted value of a received data symbol based on $$\hat{b}_k = \arg\max_{b_k \in \{b_m\}_{m=1}^M} \{Re\{r_k b_k^* V_k^*\}\}.$$

In some embodiments, the fading process is a Rician fading process, the likelihood function is $$f(r_k,p|b_k)=\iiint f(r_k,p|u_k,v,b_k)\cdot f(u_k,v)du_k dv,$$

the data symbol has one of a plurality of possible values having unequal energies, and the communication signal processing module is configured to determine a transmitted value of a received data symbol based on $$\hat{b}_k = \arg\max_{b_k \in \{b_m\}_{m=1}^M} \left\{ Re\{r_k b_k^* V_k^*\} - \sigma_n^4 \ln\left|\frac{|b_k|^2}{\sigma_n^2} + d\right| + \sigma_n^4 A_k + \sigma_n^4 B_k \right\}.$$

In some embodiments, the apparatus is implemented in a communication signal receiver.

Another aspect of the invention provides a method including operations of receiving from a communication channel a communication signal containing unknown data symbols and known pilot symbols, and determining a transmitted value of a received data symbol based on at least one pilot symbol in the received communication signal, a received value of at least one data symbol, and a likelihood function, the likelihood function taking into account an assumption of a fading process on the communication channel and a specular component of the fading process.

In some embodiments, the operation of determining involves selecting from a plurality of possible values of the data symbol a value that maximizes the likelihood function.

In some embodiments, the operation of determining involves computing a respective intermediate value for each of a plurality of possible values of the data symbol, and determining a respective likelihood value for each possible value of the data symbol, the respective likelihood values being a function of a received value of the data symbol and the respective intermediate values.

In some embodiments, the method also includes using an intermediate value computed for a received data symbol in performing a function for another received communication signal.

In some embodiments, the operation of receiving involves receiving a plurality of diversity components of the communication signal and combining the received diversity components to generate the received communication signal, and the operation of using comprises using the intermediate value in combining other received diversity components.

In some embodiments, the fading process is a Rician fading process, the likelihood function is $$f(r_k,p|b_k)=\iiint f(r_k,p|u_k,v,b_k)\cdot f(u_k,v)du_k dv$$

the data symbol has one of a plurality of possible values having equal energies, and determining involves determining a transmitted value of a received data symbol based on $$\hat{b}_k = \arg\max_{b_k \in \{b_m\}_{m=1}^M} \{Re\{r_k b_k^* V_k^*\}\}.$$

In some embodiments, the fading process is a Rician fading process, the likelihood function is $$f(r_k,p|b_k)=\iiint f(r_k,p|u_k,v,b_k)\cdot f(u_k,v)du_k dv$$

the data symbol has one of a plurality of possible values having unequal energies, and determining involves determining a transmitted value of a received data symbol based on $$\hat{b}_k = \arg\max_{b_k \in \{b_m\}_{m=1}^M} \left\{ Re\{r_k b_k^* V_k^*\} - \sigma_n^4 \ln\left|\frac{|b_k|^2}{\sigma_n^2} + d\right| + \sigma_n^4 A_k + \sigma_n^4 B_k \right\}.$$

In some embodiments, a computer readable medium stores instructions executable by one or more processing elements for performing a method.

There is also provided an apparatus which includes an input for receiving a communication signal containing unknown data symbols and known pilot symbols, and a communication signal processing module operatively coupled to the input and configured to determine a transmitted value of an unknown data symbol from possible values of at least one unknown data symbol that maximizes a likelihood function, the likelihood function taking into account an assumption of a fading process and being a function of a) a known value of the at least one pilot symbol and received samples of the at least one pilot symbol, and b) received samples of the at least one unknown data symbol and the possible values of the at least one unknown data symbol.

In some embodiments, the fading process is a Rayleigh process, the likelihood function is $$f(r_k,p|b_k)=\iiint f(r_k,p|u_k,v,b_k)\cdot f(u_k,v)du_k dv$$

the unknown data symbol has one of a plurality of possible values having equal energies, and the communication signal processing module is configured to determine a transmitted value of an unknown data symbol based on $$\hat{b}_k = \arg\max_{b_k \in \{b_m\}_{m=1}^M} \{Re\{r_k b_k^* X_k^*\}\}.$$

In some embodiments, the fading process is a Rayleigh process, the likelihood function comprises $$f(r_k,p|b_k)=\iiint f(r_k,p|u_k,v,b_k)\cdot f(u_k,v)du_k dv$$

the unknown data symbol has one of a plurality of possible values having unequal energies, and the communication signal processing module is configured to determine a transmitted value of an unknown data symbol based on $$\hat{b}_k = \arg\max_{b_k \in \{b_m\}_{m=1}^M} \left\{ Re\{r_k b_k^* X_k^*\} - \sigma_n^4 \ln\left|\frac{|b_k|^2}{\sigma_n^2} + d\right| + \sigma_n^4 A_k \right\}.$$

There is also provided a method which includes receiving a communication signal containing unknown data symbols and known pilot symbols, and determining a transmitted value of an unknown data symbol from possible values of at least one unknown data symbol that maximizes a likelihood function. The likelihood function takes into account an assumption of a fading process and is a function of a) a known value of the at least one pilot symbol and received samples of the at least one pilot symbol, and b) received samples of the at least one unknown data symbol and the possible values of the at least one unknown data symbol.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings, in which.

DETAILED DESCRIPTION OF THE PREFERRED EMBODIMENTS

Figure 1:
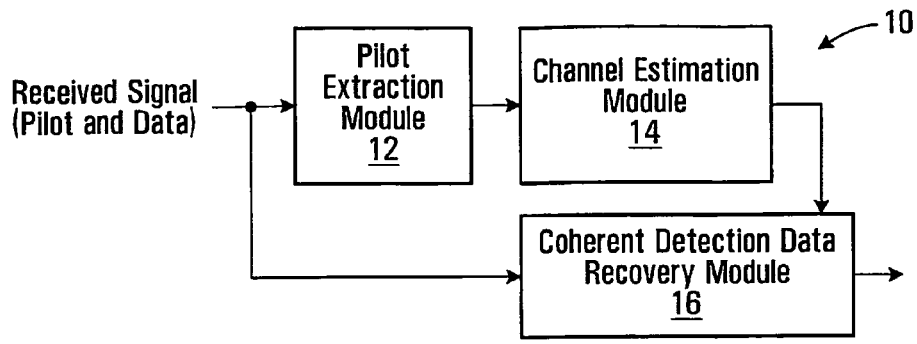
FIG. 1 is a block diagram of a conventional CPSAM receiver.

FIG. 1 is a block diagram of a conventional CPSAM receiver 10, which includes a pilot extraction module 12, a channel estimation module 14, and a coherent detection data recovery module 16. A signal received by the pilot extraction module 12 contains known pilot symbols and unknown data symbols, and is processed to extract the pilot symbols. Channel estimation is performed by the channel estimation module 14 on the basis of the pilot symbols to produce channel estimates. These channel estimates are then used by the data recovery module 16 in performing data recovery for the unknown data samples using coherent detection.

According to an embodiment of the invention, rather than performing channel estimation and signal detection separately and independently, channel estimation and signal detection are performed jointly. Effectively, a better channel estimate that takes advantage of the characteristics of the data as well as the pilot is generated.

Broadly speaking, the design of a signal detector of an embodiment of the invention may involve deriving a likelihood function for the joint processing of data symbols and pilot symbols. In some embodiments, the likelihood function takes into account a "line of sight" or specular component. The likelihood function for each data symbol may also or instead be a function of a known value of at least one pilot symbol and a received sample of each of the at least one pilot symbol, received samples of one or more unknown data symbols and possible values of the one or more unknown data symbol, and a known fading process.

Signal detection may then be performed by determining the values of data symbols selected from the possible values of the unknown data symbols that maximize the likelihood function.

Figure 2:
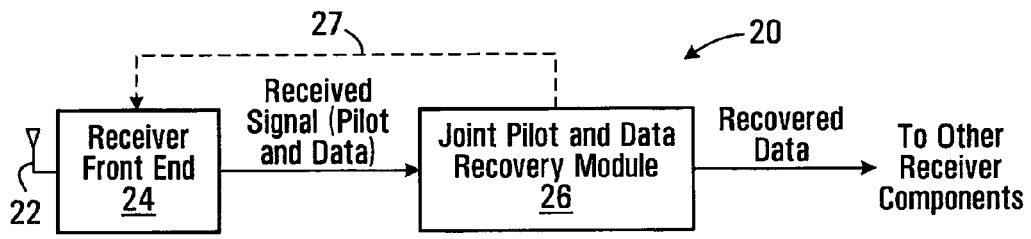
FIG. 2 is a block diagram of a receiver in which joint pilot and data recovery are implemented.

Referring now to FIG. 2, shown is a block diagram of a receiver 20 in which joint pilot and data recovery are implemented. The receiver 20 includes one or more antennas 22, a receiver front end 24 which may implement such functions as diversity combining where the receiver includes multiple antennas 22, and a joint pilot and data recovery module 26.

Those skilled in the art will appreciate that the specific implementation of the antenna(s) 22, the receiver front end 24, and the joint pilot and data recovery module 26 will be dependent upon the type of communication signals which the receiver 20 is intended to receive. Generally, the antenna(s) 22 will be implemented in hardware, although the receiver front end 24 and/or the module 26 may be implemented using any of hardware, processing hardware executing software, firmware, or any suitable combination thereof. A processing element such as a microprocessor, an Application Specific Integrated Circuit (ASIC), a Field Programmable Gate Array (FPGA), or a Digital Signal Processor (DSP), for example, may be suitable for this purpose.

In operation, a received signal containing known pilot symbols and unknown data symbols is received at the antenna(s) 22 and may be processed by the receiver front end 24. Received samples of the pilot symbols and unknown data symbols are processed jointly by the module 26 to produce for each data symbol a recovered data symbol that maximizes the likelihood function for the joint processing of pilot and data symbols.

According to one embodiment, a feedback connection 27 is provided between the receiver front end 24 and the module 26 to allow channel information determined by the module 26 to be used by the receiver front end 24 for initial communication signal processing. Diversity combining, for example, uses channel estimates to combine signals received by different antennas, and accordingly channel estimates determined by the module 26 could be fed back to a diversity combiner in the receiver front end 24.

Figure 3:
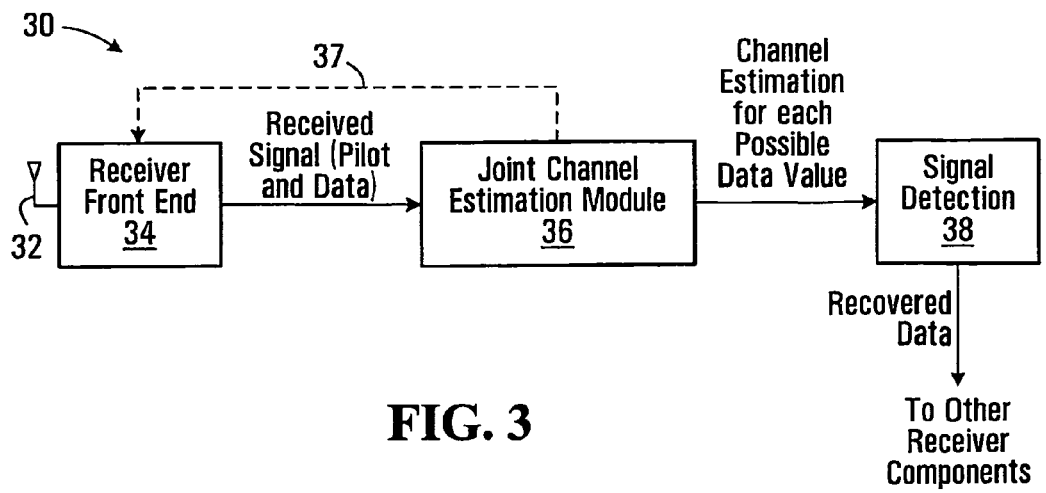
FIG. 3 is a block diagram of a receiver in which joint channel estimation based on both pilot and data symbols is implemented.

Practically, the joint processing can be split into two steps such as shown in FIG. 3, which is a block diagram of a receiver 30 in which joint channel estimation based on both pilot and data symbols is implemented. The receiver 30 is substantially similar in structure to the receiver 20 (FIG. 2) in that it includes one or more antennas 32 and a receiver front end 34. In the receiver 30, however, the functions of the joint pilot and data recovery module 26 have been split between a joint channel estimation module 36 and a signal detector 38.

The various components of the receiver 30, like those of the receiver 20, may be implemented using hardware, processing hardware executing software, firmware, or some combination thereof, although at least the antenna(s) 32 would normally be provided as hardware.

A first part of the processing performed by the joint channel estimation module 36 determines an intermediate value of the likelihood function for each possible value of an unknown data symbol received through the antenna(s) 32 and the receiver front end 34. This can be used to determine a value that is somewhat analogous to a channel gain estimate. The channel gain estimate is a function of the received sample for one or more pilot symbols, the received sample for an unknown data symbol, and the unknown value of the data symbol. $X_K$ is a function of the received samples. Thus, if there are M possible different values for the unknown data symbol, M channel gain estimates are produced. Next data recovery/signal detection is performed by the signal detector 38 using the M channel estimates to determine the most likely transmitted data symbol.

The receiver 30 may also include a feedback connection 37 for feeding the channel estimates back to the receiver front end 34. These channel estimates may then be used in the receiver front end 34 for such signal processing tasks as diversity combining for instance.

The form of the signal detector 38 will depend upon the nature of the fading channel over which the signal was transmitted. Two example signal detectors are derived below for Rayleigh and Rician fading channels under very specific circumstances concerning the channel and concerning pilot and data symbol location. Similar derivations can be performed for applications where these specific circumstances are not met, in particular, for receiver systems using diversity.

Of particular significance is the solution for the Rician fading channel. Such a channel includes a line of sight component, something that is not taken into account with conventional PSAM detection schemes such as that described with reference to FIG. 1. The Rician fading channel assumption effectively becomes an input to the determination of the joint likelihood function.

The above summarizes PSAM techniques provided by illustrative embodiments of the invention. Although the embodiments described above provide receivers adapted to implement these techniques for signal detection, other embodiments may use these techniques for diversity combining, as noted above, for signal detection and diversity combining done jointly or separately, or for other purposes, some of which are described herein. In the case of diversity combining, for example, joint PSAM techniques may be used in conjunction with either a conventional diversity combiner which combines received communication signals from different antennas in a known manner, or a modified diversity combiner which is adapted to receive channel information determined in accordance with joint PSAM techniques.

It will be appreciated from the foregoing that an embodiment of the invention may be considered a form of a communication signal processor, which may include a joint pilot and data recovery module such as 26 (FIG. 2) or a joint channel estimation module 36 (FIG. 3), possibly in combination with a signal detector 38. An input to this communication signal processor may come from the antenna(s) 22, 32 or from another component, illustratively the receiver front end 24, 34, which performs some initial processing such as diversity combining.

Recovered data symbols, intermediate values such as channel gain estimates used in signal detection, or both, may be made provided at an output of a communication signal processor. Recovered data symbols may be provided to downstream components in a receive path, and channel gain estimates may be provided to upstream components for use by a diversity combiner, for example.

Figure 4:
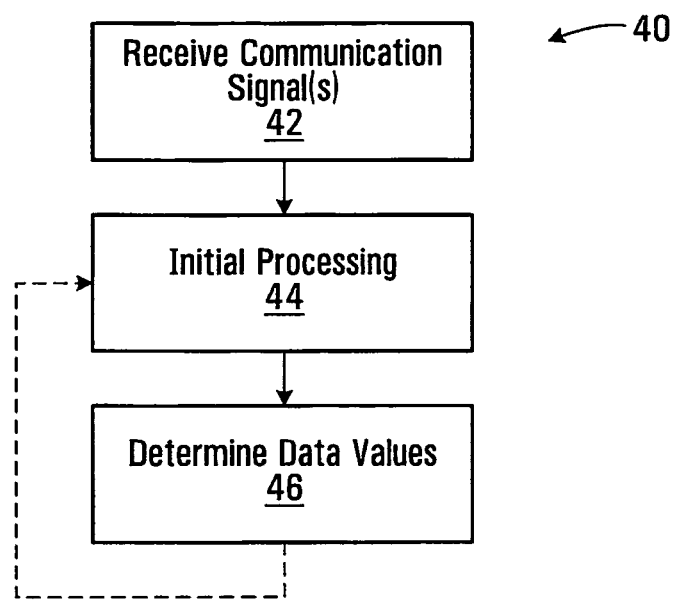
FIG. 4 is a flow diagram of a communication signal processing method.

FIG. 4 is a flow diagram of a communication signal processing method. The method 40 begins at 42 with an operation of receiving a communication signal, or multiple diversity components in the case of a diversity receiver, from a communication channel.

At 44, initial processing of the communication signal, to combine received diversity components, for example, may be performed.

A value of a received data symbol in the received communication signal is determined at 46. As described in detail above, this determination may be based on both pilot symbols and data symbols in the received communication signal, as well as a likelihood function which takes into account an assumption of a fading process on the communication channel and a specular component of the fading process.

The determined data symbol values and/or intermediate values or information used in determining the data symbol values may be used in performing a function for another received communication signal, and possibly for other purposes. The use of such information for initial processing of received signal(s) is represented in FIG. 4 by the dashed line connecting 46, 44. Diversity combining is one example of a function which may use information determined during a signal detection process, although other functions, performed upstream or downstream of signal detection, may similarly use channel information or other information generated during signal detection.

It should be appreciated that the method 40, like the contents of the other drawings, is intended solely for the purposes of illustration. Other embodiments of the invention may include further, fewer, or different operations which are performed in a similar or different order than explicitly shown. Similar variations may be made in the general receiver structures 20, 30 of FIGS. 2 and 3, to provide further, fewer, or different elements, interconnected in a similar or different manner than shown.

Embodiments of the invention have been described above primarily in the context of apparatus and methods. However, further implementations are also contemplated. For example, another embodiment of the invention provides a computer readable medium having instructions stored thereon executable by one or more processing elements for implementing any of the techniques described herein.

Details of particular examples of joint PSAM (JPSAM) signal detection in Rayleigh and Rician fading channels will now be described. These are to be considered very specific examples of the generalized detectors and techniques introduced above. A signal detector is derived below by maximizing the likelihood function that is obtained based on using both pilot symbols and data symbols. It is assumed that the auto-covariance function of the fading process is known, as was assumed in [2] and [4]. The bit error rate (BER) of BPSK is obtained analytically, while the symbol error rate (SER) of 16-QAM is obtained by simulation. Performance of an example JPSAM detector is compared with that of the CPSAM detector. Numerical examples are presented to show that a JPSAM according to an embodiment of the invention detector can have substantially better performance than the CPSAM detector in Rician fading.

System Model

Consider a PSAM system where symbols are transmitted in frames of length K. Without loss of generality, assume that, in each frame, the first symbol is a pilot symbol and the following K−1 symbols are data symbols. Each data symbol comes from a set of M possible signals, $\{b_m\}_{m=1}^{M}$. The pilot symbol usually comes from the same signaling set, but its value is known as $\tilde{b}$. In some embodiments, the pilot symbols may be derived from other circuitry and be highly reliable rather than known. These frames are transmitted over a flatly fading channel. The received signal can be written as $$r(t) = u(t)s(t) + n(t) \tag{1}$$

where u(t) is the complex channel gain, s(t) is the transmitted signal, and n(t) is additive white Gaussian noise (AWGN). Following the model in [2], the transmitted signal, s(t), satisfies $$s(t) = \sum_{j=-\infty}^{\infty} b_j p(t - jT) \tag{2}$$

where $b_j$ is the value of the j-th symbol coming from $\{b_m\}_{m=1}^{M}$, T is the symbol period, and p(t) is the shaping pulse with energy $E_p$. If the j-th symbol is a pilot symbol, $b_j = \tilde{b}$ is known. Otherwise, it is unknown and may be one of M possible values.

The complex channel gain, u(t), is a Gaussian random process. Denoting u(t) as $u(t) = u^R(t) + ju^I(t)$, if the channel is Rayleigh faded, one has [5]

$$E\{u^R(t)\} = E\{u^I(t)\} = 0 \tag{3a}$$

$$Cov(u^R(t), u^I(t)) = 0 \tag{3b}$$

$$Cov(u^R(t), u^R(t)) = Cov(u^I(t), u^I(t)) = \sigma_u^2 \tilde{R}_u(\tau) \tag{3c}$$

where $Cov(u^R(t),u^I(t))=E\{[u^R(t)-E\{u^R(t)\}][u^I(t+\tau)-E\{u^I(t+\tau)\}]\}$ is the cross-covariance between $u^R(t)$ and $u^I(t)$, $Cov(u^R(t),u^R(t))=E\{[u^R(t)-E\{u^R(t)\}][u^R(t+\tau)-E\{u^R(t+\tau)\}]\}$ is the auto-covariance of $u^R(t)$, $Cov(u^I(t),u^I(t))=E\{[u^I(t)-E\{u^I(t)\}][u^I(t+\tau)-E\{u^I(t+\tau)\}]\}$ is the auto-covariance of $u^I(t)$, and $\tilde{R}_u(\tau)$ is the normalized auto-covariance function with $\tilde{R}_u(0)=1$.

If the channel is Rician faded, one then has [5]

$$E\{u^R(t)\}=m^R(t) \quad (4a)$$

$$E\{u^I(t)\}=m^I(t) \quad (4b)$$

$$Cov(u^R(t),u^I\cdot(t))=0 \quad (4c)$$

$$Cov(u^R(t),u^R(t))=Cov(u^I(t),u^I(t))=\sigma_u^2 \tilde{R}_u(\tau) \quad (4d)$$

Note that (3) is a special case of (4) when $m^R(t)=0$ and $m^I(t)=0$. If the scattering in the Rayleigh or Rician channel is isotropic, one further has [5]

$$\tilde{R}_u(\tau)=J_0(2\pi f_D \tau) \quad (5)$$

where $f_D$ is the maximum Doppler shift in the channel. Although the analysis is not limited to any specific $\tilde{R}_u(\tau)$, (5) will be used below to obtain illustrative examples. The noise $n(t)$ is also a Gaussian random process. It has mean zero and auto-covariance $\frac{1}{2}E\{n(t)n^*(t+\tau)\} = N_0\delta(\tau)$.

Similar to [2], it is assumed that no inter-symbol interference occurs. The received signal in (1) is matched filtered and sampled at the time $t=jT$. The received signal sample of the j-th symbol is $$r_j=u(jT)b_j E_p+n_j \quad (6)$$

where $u(jT)$ is the Gaussian channel gain sample with mean zero (on a Rayleigh fading channel) or $m^R(jT)+jm^I(jT)$ (on a Rician fading channel) and variance $\sigma_u^2$, and $n_j$ is a Gaussian noise sample with mean zero and variance $\sigma_n^2=N_0 E_p$. The average signal-to-noise ratio (SNR) per bit is derived from (6) as $$\gamma_b' = \frac{E_p^2 \Omega}{\sigma_n^2 \log_2 M} E\{|b_j|^2\} \quad (7)$$

where $$\Omega = \frac{1}{2}E\{u(jT)u^*(jT)\}$$

is the mean power of the fading and $E\{|b_j|^2\}$ is the average energy of the transmitted signal. This measure gives the SNR value for any symbol, including the data symbols and the pilot symbols. A more useful SNR measure should reflect the power penalty caused by sending the pilot symbols. The effective average SNR per bit can be obtained by dividing the total power of one frame with the number of data symbols in it. This gives $$\gamma_b = \frac{E_p^2 \Omega}{\sigma_n^2 \log_2 M} \cdot \frac{|\tilde{b}|^2 + (K-1)E\{|b_j|^2\}}{K-1}. \quad (8)$$

Without loss of generality, let the n-th symbol in the transmitted sequence be a pilot symbol. Then, the (n+1)-th, (n+2)-th, ..., (n+K−1)-th symbols in the transmitted sequence are data symbols in the same frame. Assume that the J nearest pilot symbols are used to assist the data symbol detection in a frame. Let the function, [x], return the largest integer that is less than x. In this case, the $$\left(n+\left[-\frac{J-1}{2}\right]K\right)\text{-th},$$

..., n-th, ..., $$\left(n+\left[\frac{J-1}{2}\right]K\right)\text{-th}$$

symbols in the transmitted sequence are the pilot symbols that will be used to assist the detection of the (n+1)-th, (n+2)-th, ..., (n+K−1)-th symbols in the transmitted sequence, which are data symbols. For clarity, it is desirable to use different notations to denote the received signal for a data symbol and the received signals for the pilot symbols. It is also desirable to replace the indices, $$\left(n+\left[-\frac{J-1}{2}\right]K\right),$$

..., n, ..., $$\left(n+\left[\frac{J-1}{2}\right]K\right),$$

with some simpler indices. Denote the received signal sample of the data symbol to be detected as $$r_k=u_k b_k+n_k \quad (9)$$

where $u_k=u(kT)E_p$ and $k=n+1,n+2,\ldots,n+K-1$. Also, denote the received signal samples of the pilot symbols that will be used to assist the detection of $b_k$ as $$p_i=v_i\tilde{b}+n_i \quad (10)$$

where $v_i=u(iT)E_p$ and $i=(1),(2),\ldots,(J)$ corresponds to the indexes, $$\left(n+\left[-\frac{J-1}{2}\right]K\right),\ldots,n,\ldots,\left(n+\left[\frac{J-1}{2}\right]K\right),$$

respectively. Express the complex channel gains as $u_k=u_k^R+ju_k^I$ and $v_i=v_i^R+jv_i^I$. It can be derived from (3) and (4) that the covariance between $u_k^R$ and $v_i^R$ (or $u_k^I$ and $v_i^I$) is $w_k(i)=E_p^2\sigma_u^2\tilde{R}_u((k-i)T)$, $i=(1),(2),\ldots,(J)$, and the covariance between $v_i^R$ and $v_j^R$ (or $v_i^I$ and $v_j^I$) is $C_k(i,j)=E_p^2\sigma_u^2\tilde{R}_u((i-j)T)$, $i,j=(1),(2),\ldots,(J)$. Finally, introduce the notations $w_k=[w_k((1)) \; w_k((2)) \; \ldots \; w_k((J))]$ and $C_k=\{C_k(i,j)\}$, where $C_k(i,j)$ is the (i,j)-th element of $C_k$, for later use.

By using the assumptions and notations defined above, it can be derived from (9) that the conditional probability density function (PDF) of $r_k$, conditioned on $u_k$ and $b_k$, is $$f(r_k \mid u_k, b_k) = \frac{1}{2\pi\sigma_n^2} \exp\left\{-\frac{1}{2\sigma_n^2}|r_k - u_k b_k|^2\right\}. \quad (11)$$

Similarly, the conditional PDF of $p_i$, conditioned on $v_1$, can be derived from (10) as $$f(p_i \mid v_i) = \frac{1}{2\pi\sigma_n^2} \exp\left\{-\frac{1}{2\sigma_n^2}|p_i - v_i \tilde{b}|^2\right\}. \quad (12)$$

Since the symbol-spaced noise samples are independent, from (11) and (12), the conditional joint PDF of $r_k$ and $p_i$ ($i=(1),(2),\ldots,(J)$), conditioned on $u_k$, $b_k$ and $v_i$ ($i=(1),(2),\ldots,(J)$), can be obtained as $$f(r_k, p \mid u_k, v, b_k) = \quad (13)$$

$$\frac{1}{(2\pi\sigma_n^2)^{J+1}} \exp\left\{-\frac{1}{2\sigma_n^2}|r_k - u_k b_k|^2 - \frac{1}{2\sigma_n^2}\sum_{i=(1)}^{(J)}|p_i - v_i \tilde{b}|^2\right\}$$

where $p=[p_{(1)} p_{(2)} \ldots p_{(J)}]$ and $v=[v_{(1)} v_{(2)} \ldots v_{(J)}]$. Finally, the likelihood function for joint processing of the data symbol and the pilot symbols can be derived by solving $$f(r_k, p \mid b_k) = \iint f(r_k, p \mid u_k, v, b_k) \cdot f(u_k, v) du_k dv \quad (14)$$

where $f(u_k, v)$ is the joint PDF of $u_k$ and $v$. In one embodiment, a JPSAM signal detector is obtained by maximizing (14) with respect to $b_k$.

Various assumptions have been made about the channel and signals. These assumptions include known auto-covariance of fading process, flat fading channel, complex Gaussian channel gain, and no inter-symbol interference. These assumptions are used to model a system upon which a solution is based. In some cases, the resulting solution is optimum if these assumptions hold true. It is to be clearly understood that the resulting solution can also be applied in systems in which one or more of the assumptions do not hold true. This may sometimes result in sub-optimal performance.

Joint PSAM Signal Detectors

To derive the value of $b_k$ that maximizes (14), one needs to solve the integration in (14) first. Since the joint PDF of $u_k$ and $v$, $f(u_k,v)$, depends on the fading channel model, the optimum maximum likelihood detector for the PSAM signal on Rayleigh and Rician fading channels are examined separately below.

A. Rayleigh Fading Channel

In a Rayleigh fading channel, the statistics of the fading process are determined by (3). Thus, the joint PDF of $u_k$ and $v$ can be derived as $$f(u_k, v) = \frac{1}{(2\pi)^{J+1}|H_k|} e^{-\frac{1}{2}u_R H_k^{-1} u_R^T - \frac{1}{2}u_I H_k^{-1} u_I^T} \quad (15)$$

where T denotes the transpose of a matrix or a vector, $|H_k|$ denotes the determinant of $H_k$, $H_k^{-1}$ denotes the inverse of $H_k$, $u_R=[u_k^R v_{(1)}^R v_{(2)}^R \ldots v_{(J)}^R]$ is a $1\times(J+1)$ row vector consisting of the real components of the channel gains, $u_I=[u_k^I v_{(1)}^I v_{(2)}^I \ldots v_{(J)}^I]$ is a $1\times(J+1)$ row vector consisting of the imaginary components of the channel gains, $H_k$ is the $(J+1)\times(J+1)$ covariance matrix with $$H_k = \begin{bmatrix} E_p^2 \sigma_u^2 & w_k \\ w_k^T & C_k \end{bmatrix} \quad (16)$$

and $w_k$, $C_k$ are defined as before. By using (15) in (14) and solving the resulting integral, it is shown in Appendix A that $$f(r_k, p \mid b_k) = \frac{1}{(2\pi\sigma_n^2)^{J+1}|H_k||F_k|} e^{\frac{1}{2}\alpha F_k^{-1}\alpha^T + \frac{1}{2}\beta F_k^{-1}\beta^T} \frac{|r_k|^2}{2\sigma_n^2} \frac{\sum_{l=(1)}^{(J)}|p_l|^2}{2\sigma_n^2} \quad (17)$$

where $$\alpha = \left[\frac{\text{Re}\{r_k b_k^*\}}{\sigma_n^2}, \frac{\text{Re}\{p_{(1)}\tilde{b}^*\}}{\sigma_n^2}, \ldots, \frac{\text{Re}\{p_{(J)}\tilde{b}^*\}}{\sigma_n^2}\right],$$

$$\beta = \left[\frac{\text{Im}\{r_k b_k^*\}}{\sigma_n^2}, \frac{\text{Im}\{p_{(1)}\tilde{b}^*\}}{\sigma_n^2}, \ldots, \frac{\text{Im}\{p_{(J)}\tilde{b}^*\}}{\sigma_n^2}\right],$$

$$F_k = H_k^{-1} + G_k, \quad G_k = \frac{1}{\sigma_n^2}\begin{bmatrix} |b_k|^2 & 0 \\ 0 & |\tilde{b}|^2 E \end{bmatrix},$$

0 is a $1\times J$ zero vector, and E is a $J\times J$ identity matrix. The optimum maximum likelihood detector chooses the value of $b_k$ that maximizes (17) from a set of M signals, $\{b_m\}_{m=1}^M$. Two important special cases will be discussed next.

1) Equal Energy Signals:

If the energies of the M possible transmitted signals are equal, such as those in the M-ary phase shift keying (MPSK) signaling, $|b_m|^2$ is a constant and is independent of m. This implies that $|b_k|^2=|\tilde{b}|^2$ and that the energy of the signal does not affect the choice of $b_k$ in (17). Ignoring those terms independent of $b_k$, one has $$f(r_k, p \mid b_k) \propto e^{\frac{1}{2}\alpha F_k^{-1}\alpha^T + \frac{1}{2}\beta F_k^{-1}\beta^T}. \quad (18)$$

Further simplification shows that $$f(r_k, p \mid b_k) \propto e^{\frac{1}{\sigma_n^4}\{\text{Re}\{r_k b_k^*\}\text{Re}\{\tilde{b}^* p S_k^T\} + \text{Im}\{r_k b_k^*\}\text{Im}\{\tilde{b}^* p S_k^T\}\}} \quad (19)$$

where $S_k$ is a $1\times J$ vector derived in Appendix B as $$S_k = \quad (20)$$

$$w_k \cdot \left[\left(\frac{\sigma_n^2}{\sigma_n^2 + E_p^2 \sigma_u^2 |b_k|^2} + \frac{\sigma_n^2 |b_k|^2 w_k Z_1 w_k^T}{(\sigma_n^2 + E_p^2 \sigma_u^2 |b_k|^2)^2}\right) E - \frac{\sigma_n^2 Z_1 C_k}{\sigma_n^2 + E_p^2 \sigma_u^2 |b_k|^2}\right]$$

and $$Z_1 = \left[C_k + \frac{\sigma_n^2}{|\tilde{b}|^2} E - \frac{|b_k|^2}{\sigma_n^2 + E_p^2 \sigma_u^2 |b_k|^2} w_k^T w_k\right]^{-1}. \quad (21)$$

Finally, a JPSAM signal detector in the Rayleigh fading channel when the transmitted signals are of equal energies can be obtained from (19) as $$\hat{b}_k = \arg \max_{b_k \in \{b_m\}_{m=1}^M} \{\text{Re}\{r_k b_k^* X_k^*\}\} \quad (22)$$

where $X_k = \tilde{b}^* p S_k^T$ and $S_k$ is given by (20). Note that the optimum detector in (22) is actually a correlator which weights the received symbol signal, $r_k$, with the conjugate channel gain estimate, $X_k^*$, and then correlates the compensated received symbol signal with the corresponding signal value, $b_k$, to make the data decision.

The performance of a JPSAM signal detector for BPSK signaling in the Rayleigh fading channel can be analyzed as follows. It has been derived in [1] that the BER of any BPSK signal detector satisfying [1, eq. (B-1)] is [1, eq. (B-21)]

$$P_b = \frac{v_1}{v_1 + v_2} \quad (23)$$

where $$v_1 = \frac{1}{\sqrt{\mu_{rr}\mu_{XX}} + \mu_{rX}}, \quad v_2 = \frac{1}{\sqrt{\mu_{rr}\mu_{XX}} - \mu_{rX}},$$

$\mu_{rr}$ is the variance of $r_k$, $\mu_{XX}$ is the variance of $X_k$, and $\mu_{rX}$ is the covariance between $r_k$ and $X_k$. Denoting $$\rho_1 = \frac{\mu_{rX}}{\sqrt{\mu_{rr}\mu_{XX}}}$$

as the covariance coefficient between $r_k$ and $X_k$, (23) can be rewritten as $$P_b = \frac{1}{2}(1 - \rho_1). \quad (24)$$

If a JPSAM signal detector is used, it can be shown that $\mu_{rr} = E_p^2 \sigma_u^2 + \sigma_n^2$, $\mu_{XX} = |\tilde{b}|^2 S_k (|\tilde{b}|C_k + \sigma_n^2 E) S_k^T$, and $\mu_{rX} = |\tilde{b}|^2 w_k S_k^T$. Then, $$\rho_1 = \frac{|\tilde{b}|^2 w_k S_k^T}{\sqrt{(E_p^2 \sigma_u^2 + \sigma_n^2)|\tilde{b}|^2 S_k (|\tilde{b}|^2 C_k + \sigma_n^2 E) S_k^T}} \quad (25)$$

where $S_k$ is given by (20). Therefore, the BER of the BPSK signaling can be evaluated analytically using (24) and (25).

2) Unequal Energy Signals:

If the energies of the M possible transmitted signals are not equal, such as those in M-ary quadrature amplitude modulation (MQAM) signaling, the choice of $b_k$ in (17) depends on $|b_k|^2$ as well. In this case, one has $$f(r_k, p \mid b_k) \propto \frac{1}{|F_k|} e^{\frac{1}{2}\alpha F_k^{-1}\alpha^T + \frac{1}{2}\beta F_k^{-1}\beta^T} \quad (26)$$

as $F_k$ is related to $|b_k|^2$. Examination of $F_k$ shows that $$|F_k| = \left|\frac{|b_k|^2}{\sigma_n^2} + d\right| \cdot \left|Z_2 + \frac{|\tilde{b}|^2}{\sigma_n^2} E\right| \quad (27)$$

where $$d = \frac{1}{E_p^2 \sigma_u^2} + \frac{1}{E_p^4 \sigma_u^4} w_k Z_2 \left(\frac{\sigma_n^2}{|\tilde{b}|^2} Z_2 + E\right)^{-1} w_k^T$$

and $$Z_2 = \left[C_k - \frac{1}{E_p^2 \sigma_u^2} w_k^T w_k\right]^{-1}.$$

Substituting (27) in (26) and doing some additional simplifications, one has $$f(r_k, p \mid b_k) \propto \frac{1}{\left|\frac{|b_k|^2}{\sigma_n^2} + d\right|} e^{\frac{1}{\sigma_n^4}\{\text{Re}\{r_k b_k^*\}\text{Re}\{\tilde{b}^* p S_k^T\} + \text{Im}\{r_k b_k^*\}\text{Im}\{\tilde{b}^* p S_k^T\}\} + A_k} \quad (28)$$

where $A_k$ is a bias term caused by the unequal energies. An expression for it can be derived from (26). Finally, a JPSAM signal detector in the Rayleigh fading channel when the transmitted signals have unequal energies can be derived from (28) as $$\hat{b}_k = \arg \max_{b_k \in \{b_m\}_{m=1}^M} \left\{\text{Re}\{r_k b_k^* X_k^*\} - \sigma_n^4 \ln\left|\frac{|b_k|^2}{\sigma_n^2} + d\right| + \sigma_n^4 A_k\right\} \quad (29)$$

where $X_k = \tilde{b}^* p S_k^T$ and $S_k$ is given by (20), as before. Comparing (29) with (22), one sees that (29) has two additional bias terms caused by the unequal energies of the transmitted signals, as expected. The detector in (29) is too complicated for analytical performance analysis. Its performance for 16-QAM signaling is evaluated by simulation.

B. Rician Fading Channel

In the previous subsection, a JPSAM signal detector for the Rayleigh fading channel was derived. This exposition served to develop the theory. In practice, some real-world channels exhibit Rician fading. In this subsection, a JPSAM signal detector for the Rician fading channel is derived.

In the Rician fading channel, the statistics of the fading process are determined by (4). Therefore, the joint PDF of $u_k$ and $v$ satisfies $$f(u_k, v) = \frac{1}{(2\pi)^{J+1}|H_k|} e^{-\frac{1}{2}(u_R - m_R)H_k^{-1}(u_R - m_R)^T - \frac{1}{2}(u_I - m_I)H_k^{-1}(u_I - m_I)^T} \quad (30)$$

where $m_R = E\{u_R\} = [m_k^R m_{(1)}^R m_{(2)}^R \ldots m_{(J)}^R]$ is the mean of $u_R$ and $m_I = E\{u_I\} = [m_k^I m_{(1)}^I m_{(2)}^I \ldots m_{(J)}^I]$ is the mean of $u_I$. One sees that (15) is a special case of (30) when $m_R = 0$ and $m_I = 0$. Similarly, by using (30) in (14) and solving the resulting integral, as shown in Appendix A, one can derive $$f(r_k, p \mid b_k) = \frac{1}{(2\pi\sigma_n^2)^{J+1}|H_k\|F_k|} \quad (31)$$

$$e^{\frac{1}{2}\alpha' F_k^{-1}\alpha^J + \frac{1}{2}\beta' F_k^{-1}\beta^J - \frac{1}{2}m_R H_k^{-1}m_R^T - \frac{1}{2}m_I H_k^{-1}m_I^T \frac{|r_k|^2}{2\sigma_n^2} \frac{\sum_{l=(1)}^{(J)}|p_l|^2}{2\sigma_n^2}}$$

where $\alpha' = \alpha + m_R H_k^{-1}$ and $\beta' = \beta + m_I H_k^{-1}$. A JPSAM signal detector in the Rician fading channel is derived by maximizing (31) with respect to $b_k$. As previously, two important special cases are discussed.

1) Equal Energy Signals:

Again, we begin with the case when the transmitted signals have equal energies. In this case, $F_k$ is independent of $b_k$. Thus, $$f(r_k, p \mid b_k) \propto e^{\frac{1}{2}\alpha' F_k^{-1}\alpha^J + \frac{1}{2}\beta' F_k^{-1}\beta^J}. \quad (32)$$

By using $\alpha' = \alpha + m_R H_k^{-1}$ and $\beta' = \beta + m_I H_k^{-1}$ in (32), one has $$f(r_k, p \mid b_k) \propto e^{1/\sigma_n^4 \{Re\{r_k b_k^*\}Re\{\bar{b}^* p S_k^T\} + Im\{r_k b_k^*\}Im\{\bar{b} p S_k^T\} + \sigma_n^2 Re\{r_k b_k^*\}m_R Q_k^T + \sigma_n^2 Im\{r_k b_k^*\}m_I Q_k^T\}} \quad (33)$$

where $Q_k$ is a $1 \times (J+1)$ vector derived in Appendix B as $$Q_k = \left[\frac{\sigma_n^2}{\sigma_n^2 + E_p^2 \sigma_u^2 |b_k|^2}\left(1 + \frac{|b_k|^2 w_k Z_1 w_k^T}{\sigma_n^2 + E_p^2 \sigma_u^2 |b_k|^2}\right) - \frac{\sigma_n^2}{\sigma_n^2 + E_p^2 \sigma_u^2 |b_k|^2} w_k Z_1\right]. \quad (34)$$

A JPSAM signal detector for equal energy signals in the Rician fading channel is derived from (33) as $$\hat{b}_k = \arg\max_{b_k \in \{b_m\}_{m=1}^M} \{Re(r_k b_k^* V_k^*)\} \quad (35)$$

where $V_k = X_k + \sigma_n^2 Y_k$, $Y_k = (m_R + jm_I)Q_k^T$, and $Q_k$ is given by (34). Several observations can be made from (35). First, note that $Y_k$ in $V_k$ is a deterministic number. Thus, $V_k$ and $X_k$ have different means but the same variances. Second, by comparing (35) with (22), one sees that there is an additional term in (35) caused by the non-zero specular component in the Rician fading channel. If the channel is Rayleigh faded, $m_R = m_I = 0$ and (35) will specialize to (22).

The performance of a JPSAM signal detector for BPSK signaling in the Rician fading channel can also be derived by using results in [1]. The BER is [1, eq. (B-21)]

$$P_b = Q_1(a, b) - \frac{v_1/v_2}{1 + v_1/v_2} I_0(ab) e^{-\frac{1}{2}(a^2+b^2)} \quad (36)$$

where $Q_1(a,b)$ is the Marcum's Q function, $I_n(\bullet)$ is the n-th order modified Bessel function of the first kind, $$a = \frac{1}{2}\left|\frac{\overline{r_k}}{\sqrt{\mu_{rr}}} - \frac{\overline{V_k}}{\sqrt{\mu_{VV}}}\right|,$$

$$b = \frac{1}{2}\left|\frac{\overline{r_k}}{\sqrt{\mu_{rr}}} + \frac{\overline{V_k}}{\sqrt{\mu_{VV}}}\right|,$$

$$\overline{r_k} = E_p(m_k^R + jm_k^I),$$

$$\overline{V_k} = |\bar{b}|^2 E_p(m_p^R + jm_p^I) S_k^T + \sigma_n^2 Y_k,$$

$$m_p^R = [m_{(1)}^R \quad m_{(2)}^R \quad \ldots \quad m_{(J)}^R],$$

$$m_p^I = [m_{(1)}^I \quad m_{(2)}^I \quad \ldots \quad m_{(J)}^I],$$

$$\mu_{VV} = \mu_{XX},$$

$$\mu_{rV} = \mu_{rX} \text{ and } v_1,$$

$v_2, \mu_{rr}, \mu_{XX}, \mu_{rX}$ are defined as before. Denoting $$\rho_2 = \frac{\mu_{rV}}{\sqrt{\mu_{rr}\mu_{VV}}}$$

as the covariance coefficient between $r_k$ and $V_k$, (36) can be rewritten as $$P_b = Q_1(a, b) - \frac{1+\rho_2}{2} I_0(ab) e^{\frac{1}{2}(a^2+b^2)}. \quad (37)$$

It can be verified that $\rho_2 = \rho_1$ and (24) is a special case of (37) when the specular component in the fading channel is zero.

2) Unequal Energy Signals:

If the energies of the transmitted signals are not equal, the likelihood function in (31) can only be simplified to be $$f(r_k, p \mid b_k) \propto \frac{1}{|F_k|} e^{\frac{1}{2}\alpha' F_k^{-1}\alpha'^T + \frac{1}{2}\beta' F_k^{-1}\beta'^T}. \quad (38)$$

Again, by using (27) and the expressions of $\alpha'$ and $\beta'$ in (38), one has $$f(r_k, p \mid b_k) \propto \frac{1}{\left|\frac{|b_k|^2}{\sigma_n^2} + d\right|} e^{\frac{1}{\sigma_n^4}\{Re\{r_k b_k^* V_k^*\} + A_k + B_k\}} \quad (39)$$

where $B_k$ is a bias term caused by both the unequal signal energy and the non-zero specular component in the channel. Its form can be obtained from (38). Finally, a JPSAM signal detector for unequal energy signals in the Rician fading channel is $$\hat{b}_k = \arg\max_{b_k \in \{b_m\}_{m=1}^M} \left\{Re\{r_k b_k^* V_k^*\} - \sigma_n^4 \ln\left|\frac{|b_k|^2}{\sigma_n^2} + d\right| + \sigma_n^4 A_k + \sigma_n^4 B_k\right\}. \quad (40)$$

Comparing (40) with (35), one observes that there are three additional bias terms caused by the unequal energies of the transmitted signals in (40). Also, comparing (40) with (29), one sees that there is an additional bias term caused by the non-zero specular component in the Rician fading channel. When the specular component is zero, the Rican fading channel will specialize to the Rayleigh fading channel and (40) will specialize to (29), as expected. The performance of the detector in (40) for 16-QAM signaling is examined below by simulation.

Comparison with Conventional PSAM Signal Detectors

In [2] and [4], the CPSAM signal detector for BPSK signaling was derived. This detector obtains the channel gain estimate, $X'_k$, by using a Wiener filter. Following the ideas in [2], [4] and using notations and symbols defined previously, one can show that $$X'_k = \tilde{b}^* p S_k^{\prime T} \quad (41)$$

with $$S_k' = w_k [|\tilde{b}|^2 C_k + \sigma_n^2 E]^{-1}. \quad (42)$$

The channel gain estimate, $X'_k$, is used to weight the received symbol signal for data decision. Therefore, the CPSAM signal detector for BPSK signaling can be written as [2], [4]

$$\hat{b}_k = \arg\max_{b_k \in \{b_m\}_{m=1}^M} \{Re\{r_k b_k^* X_k'^*\}\} \quad (43)$$

where $X'_k$ is given by (41). Comparing (43) with (22) and (35), one sees that the CPSAM detector has similar computation complexity to a JPSAM signal detector. Both use matrix inversion to derive the channel estimate. The main difference comes from their ways of obtaining the channel gain estimate. In the CPSAM signal-detector, the channel estimate is obtained by using the pilot symbols only, and channel estimation and signal detection are performed separately. However, in JPSAM signal detectors, the channel estimate is obtained by processing both the pilot symbols and the data symbols, and channel estimation and signal detection are performed jointly in some embodiments. As a result, $X'_k$ does not depend on $b_k$, while $X_k$ and $V_k$ do, in general.

The performance of the CPSAM signal detector for BPSK signaling can also be evaluated analytically by using results in [1]. The BER of the CPSAM signal detector for BPSK signaling in the Rayleigh fading channel is, again, given by (24). However, the value of $\rho_1$ in (25) should be replaced by [2]

$$\rho_1' = \frac{|\tilde{b}|^2 w_k S_k^{\prime T}}{\sqrt{(E_p^2 \sigma_u^2 + \sigma_n^2)|\tilde{b}|^2 S_k'(|\tilde{b}|^2 C_k + \sigma_n^2 E) S_k^T}} \quad (44)$$

for the CPSAM signal detector, where $S'_k$ in (44) is different from $S_k$ in (25) and is defined in (42). It is proved in Appendix C that (25) and (44) are actually equivalent for the Rayleigh fading channel, but they are different for the Rician facing channel. Although the CPSAM signal detector and a JPSAM signal detector have different channel gain estimates, their BER performances are the same for BPSK signaling in the Rayleigh fading channel. We have confirmed numerically that the CPSAM channel gain estimate is a scaling of a JPSAM channel gain estimate for all cases considered.

The BER of the CPSAM signal detector for BPSK signaling in the Rician fading channel can also be derived from (37). However, the values of a, b and $\rho_2$ in (37) should be replaced by the corresponding values of $$d = \frac{1}{2}\left|\frac{r_k}{\sqrt{\mu_{rr}}} - \frac{X'_k}{\sqrt{\mu_{X'X'}}}\right|, \quad b' = \frac{1}{2}\left|\frac{r_k}{\sqrt{\mu_{rr}}} + \frac{X'_k}{\sqrt{\mu_{X'X'}}}\right|,$$

-continued $$\rho_2' = \rho_1', \text{ where } \overline{X'_k} = |\tilde{b}|^2 E_p(m_p^R + m_p^I) S_k^T,$$

$$\mu_{X'X'} = |\tilde{b}|^2 S_k'(|\tilde{b}|^2 C_k + \sigma_n^2 E) S_k^{\prime T}, \text{ and } \rho_1' \text{ is given in (44)}.$$

The CPSAM signal detector for 16-QAM signaling was derived in [2] and [3] as a threshold-based detector. To facilitate the performance comparison below, its correlator-based form is used. Following similar ideas and procedures to those in [2] and [3], one can derive the CPSAM signal detector for 16-QAM signaling in its correlator-based form as $$\hat{b}_k = \arg\max_{b_k \in \{b_m\}_{m=1}^M} \left\{Re\{r_k b_k^* X_k'^*\} - \frac{|b_k|^2}{2}|X'_k|^2\right\} \quad (45)$$

where $X'_k$ is given in (41). Comparing the CPSAM signal detector in (45) with the JPSAM signal detectors in (29) and (40), one sees that they have similar correlation structures but different bias terms. Their performances are examined below by simulation.

Numerical Results and Discussion

In this section, the performances of several illustrative example JPSAM signal detectors derived above are compared with those of the CPSAM signal detectors. To make the comparison fair, the only case considered is when the means of the fading process in (4) are constant, as time-varying means will give a non-stationary channel and the Wiener filter used in the conventional detectors cannot be applied in such a channel.

Thus, one has $m^R(t) = m^R$ and $m^I(t) = m^I$. Define $P^2 = (m^R)^2 + (m^I)^2$ as the local mean power of the line-of-sight component in the Rician fading channel and $$R_K = \frac{P^2}{2\sigma_u^2}$$

as the Rician K factor [1]. The performances of the detectors at $R_K=0$ (the Rayleigh fading channel), $R_K=4$ and $R_K=8$ are examined. Also, it is assumed that the scattering in the fading channel is isotropic, and the values of the normalized maximum Doppler shift (normalized with respect to the symbol rate), $f_D T=0.03$, $f_D T=0.06$, and $f_D T=0.09$ are used. The frame length is chosen to be K=5, and the number of pilot symbols used to assist the detection of the data symbol is chosen to be J=11. Both BPSK signaling and 16-QAM signaling are considered. The detector performances are presented in terms of the relationship between the effective average SNR per bit, y, and the BER (for BPSK signaling) or SER (for 16-QAM signaling). The error rates are obtained by averaging the error rates of the data symbols over all positions in one frame.

Figure 5:
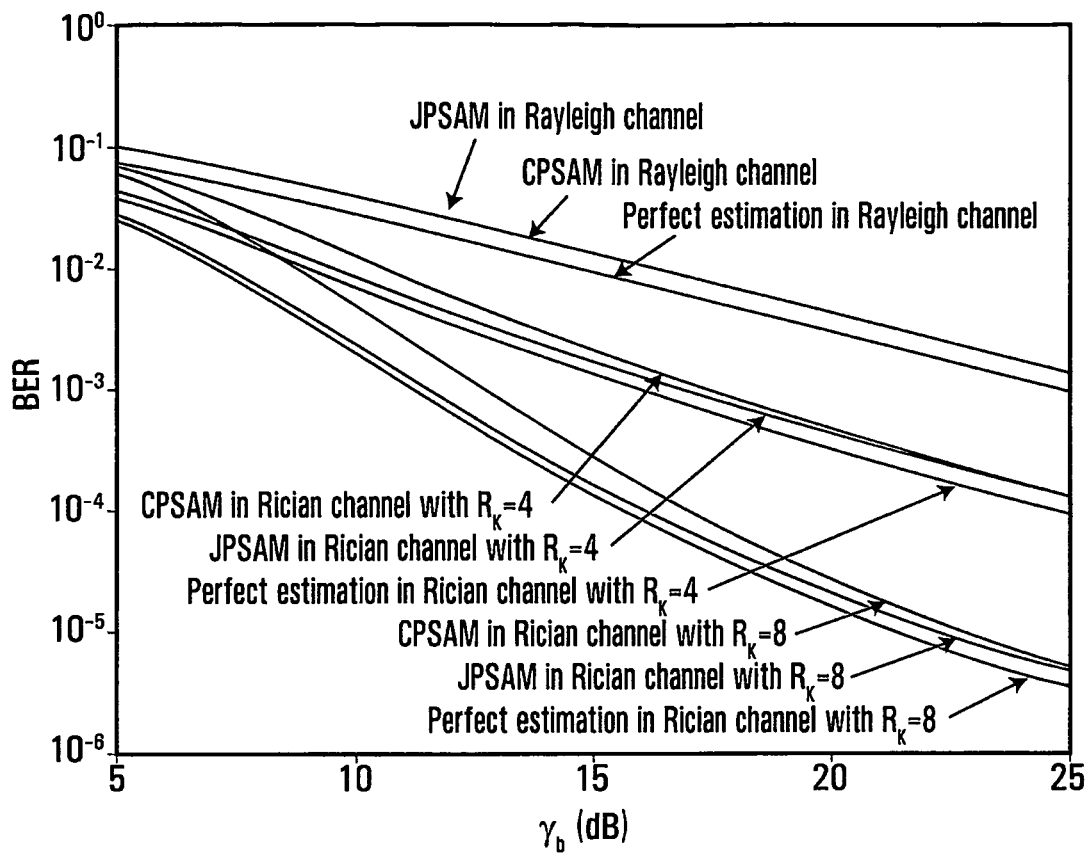
FIGS. 5-7 are example signal detector performance plots for Binary Phase Shift Keying (BPSK) signaling in Rayleigh and Rician fading channels.
Figure 6:
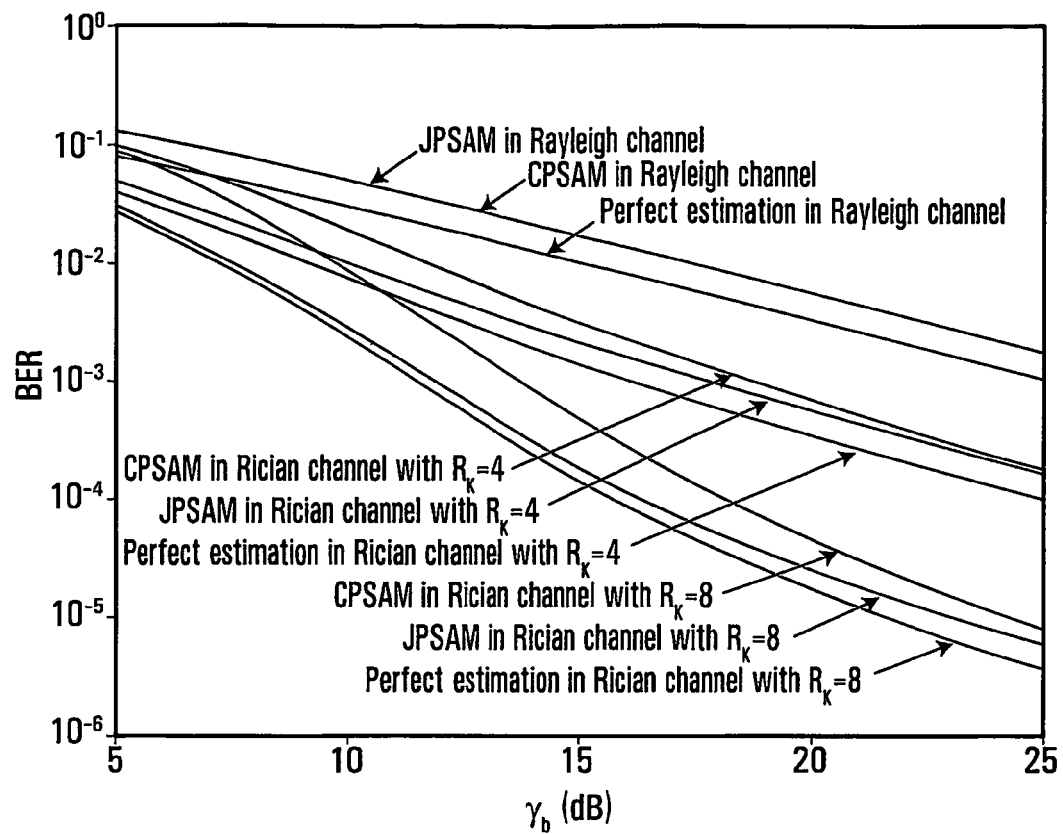
Figure 7:
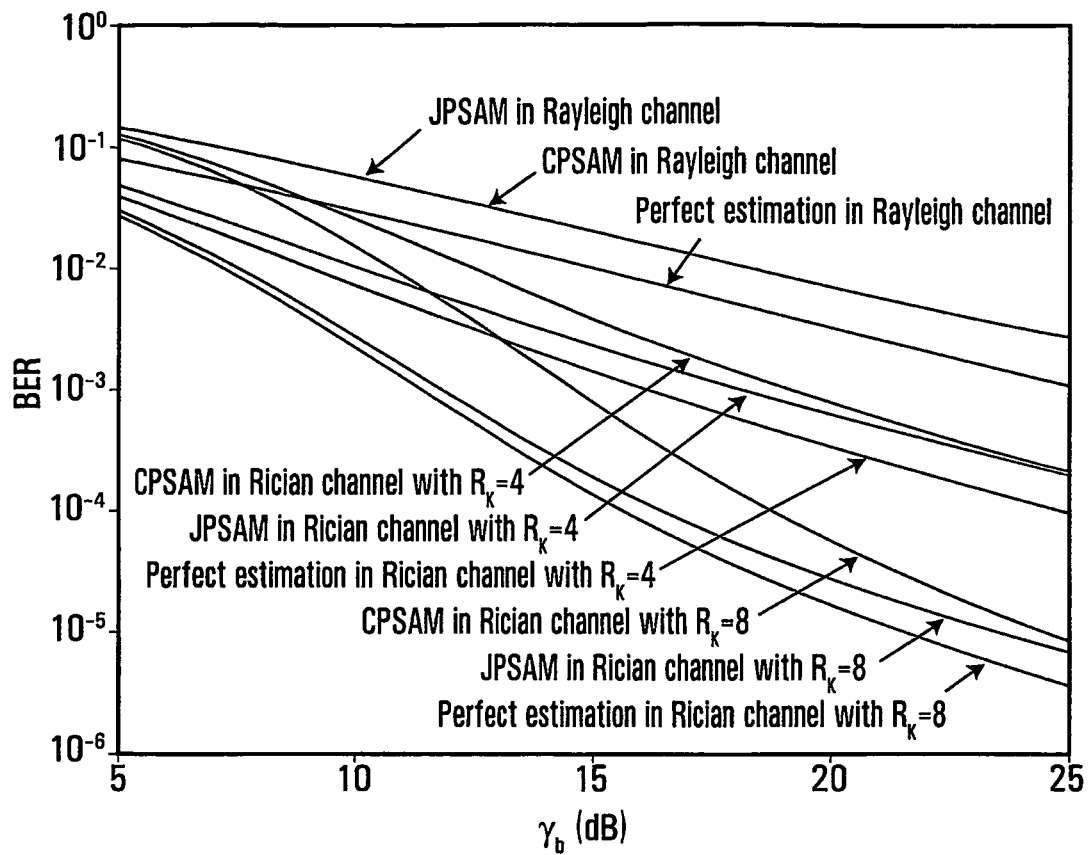
Figure 8:
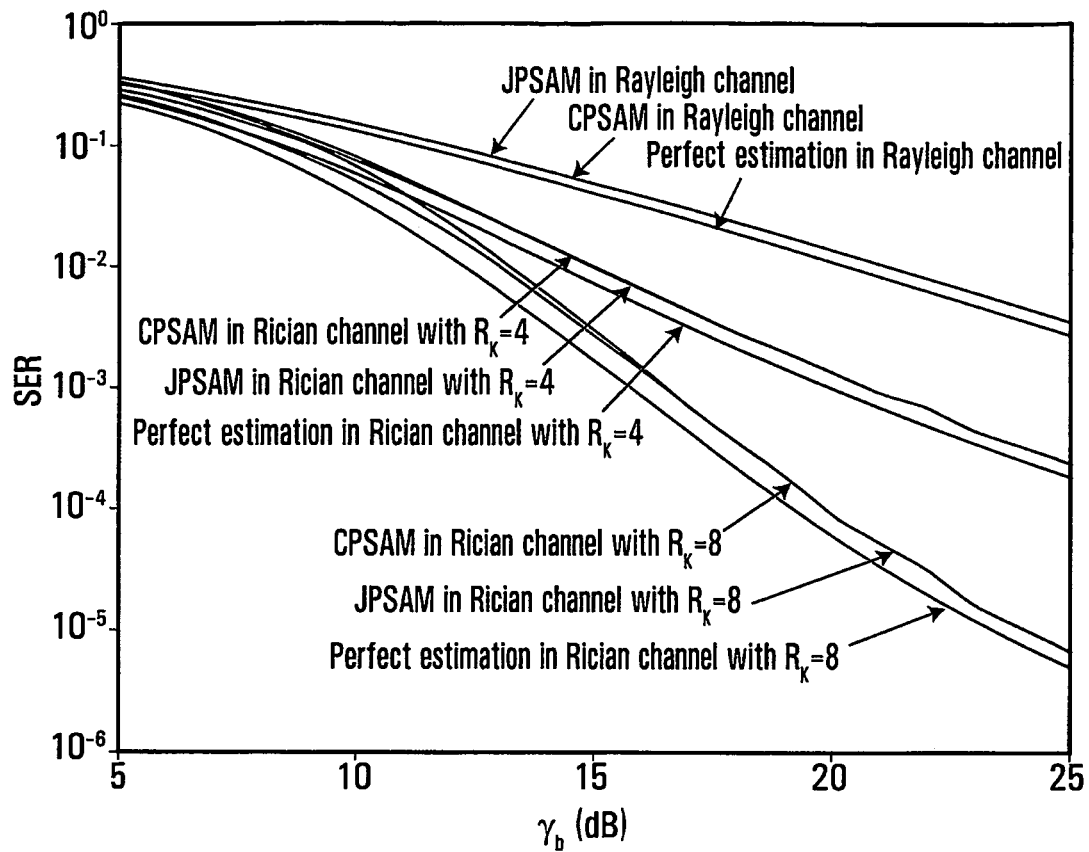
FIGS. 8-10 are example signal detector performance plots for 16-ary Quadrature Amplitude Modulation (16-QAM) signaling in Rayleigh and Rician fading channels.
Figure 9:
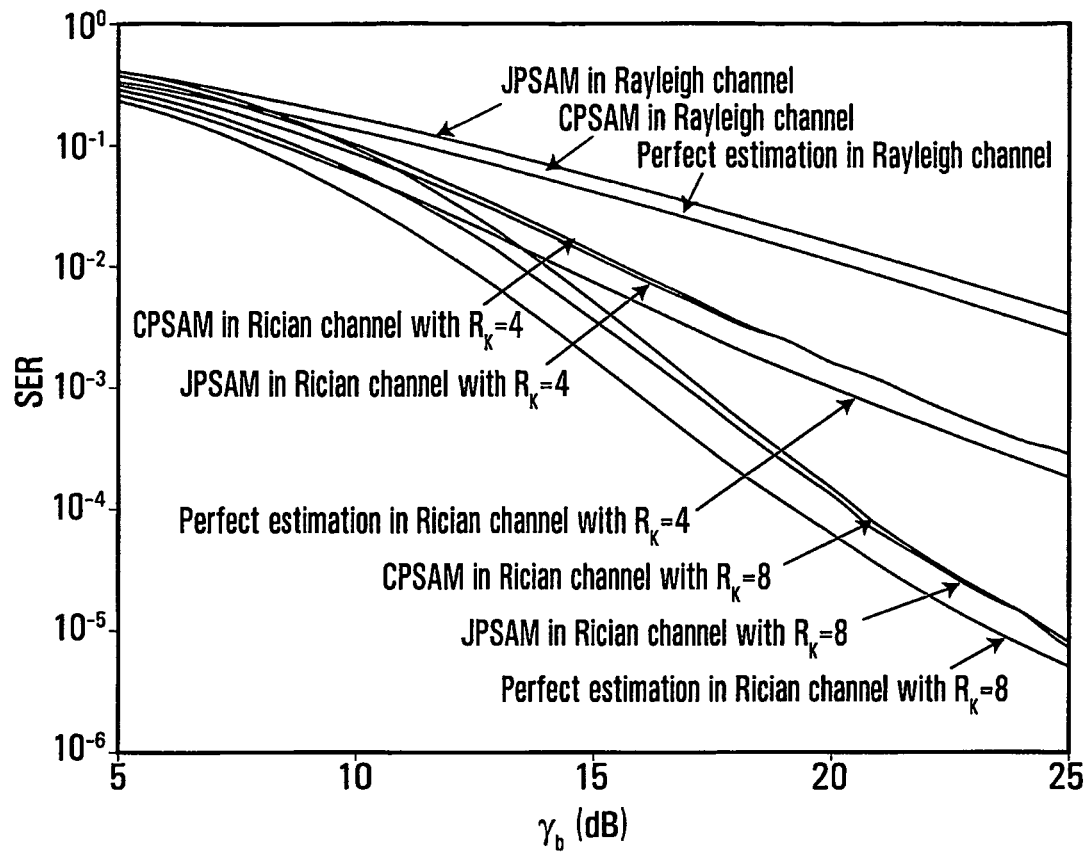
Figure 10:
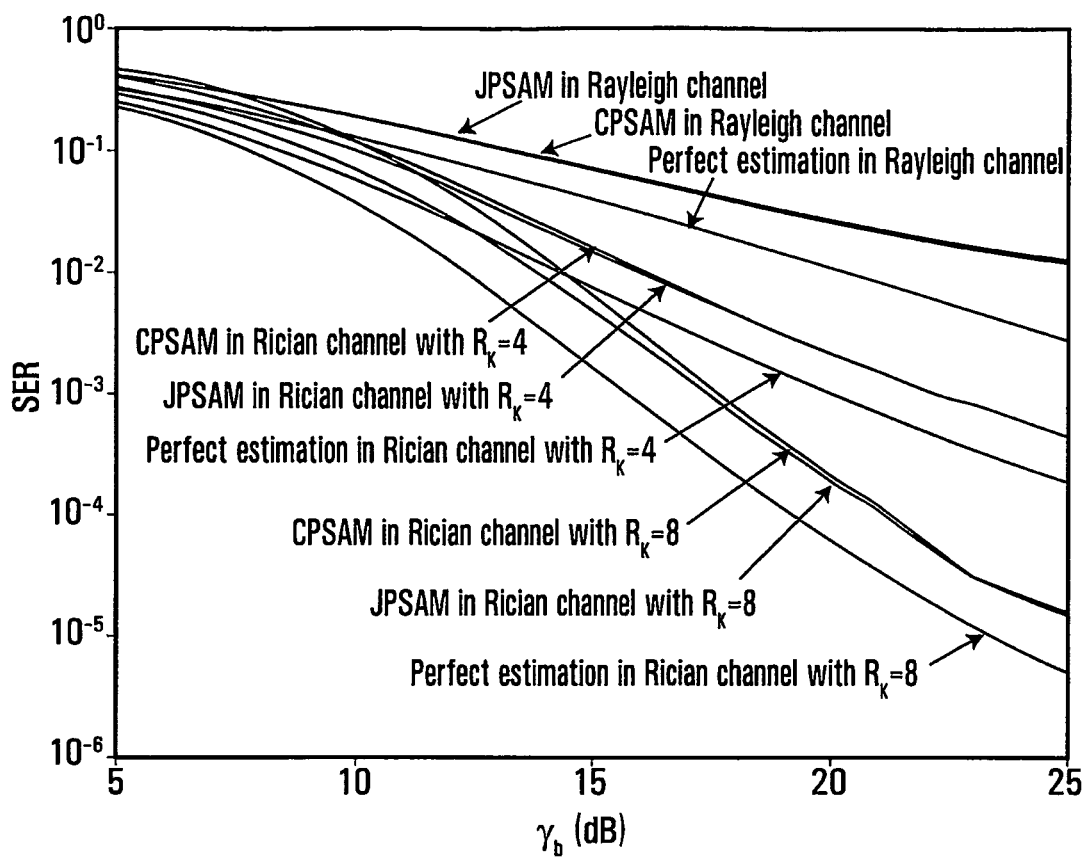
Figure 11:
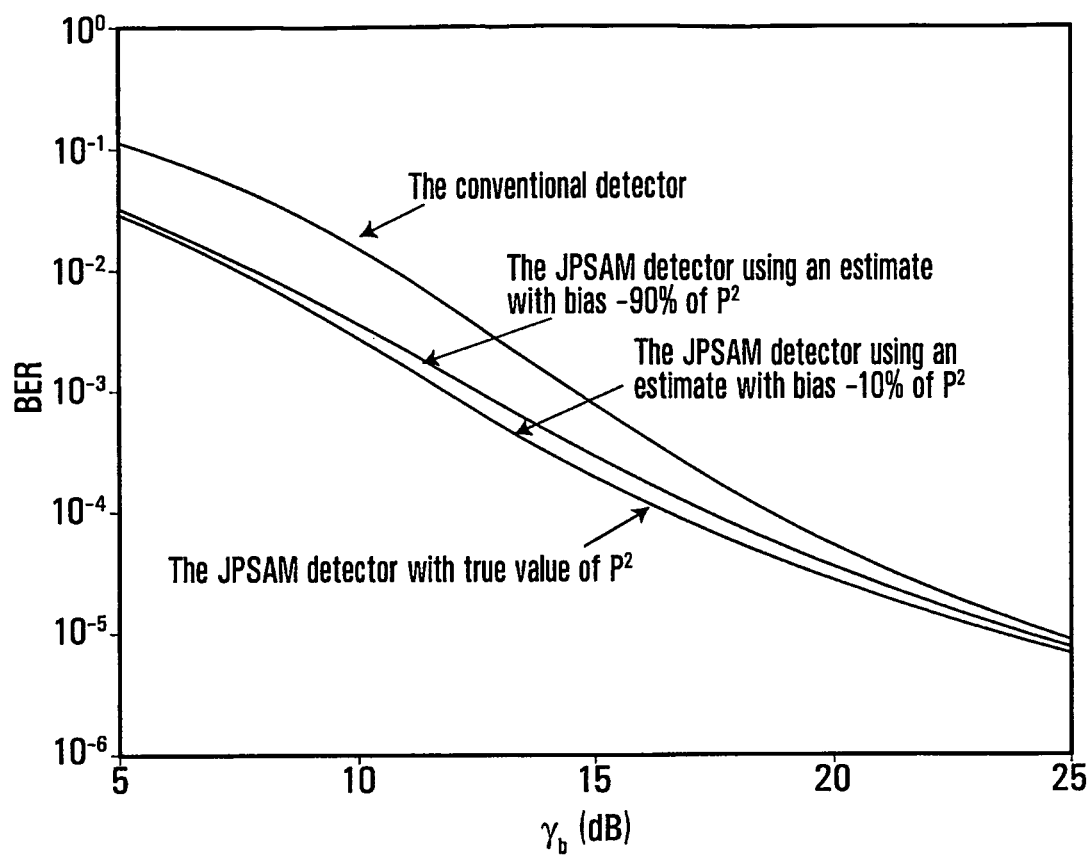
FIG. 11 is an example performance plot for a signal detector according to an embodiment of the invention for BPSK signaling in a Rician fading channel.

Various performance plots are shown in FIGS. 5-11. FIGS. 5-7 show performance plots for example JPSAM and CPSAM signal detectors for BPSK signaling in Rayleigh and Rician fading channels when $f_D T=0.03$, $f_D T=0.06$, and $f_D T=0.09$, respectively. In FIGS. 8-10, performance plots for example JPSAM and CPSAM signal detectors for 16-QAM signaling are shown for $f_D T=0.03$, $f_D T=0.06$, and $f_D T=0.09$, respectively. FIG. 11 shows performance plots of example JPSAM signal detectors for BPSK signaling in Rician fading channels when estimates of $P^2$ with different accuracies are used at $f_D T=0.09$ and $R_K=8$.

With reference first to FIGS. 5 to 7, these Figures show the performances of JPSAM signal detectors for BPSK signaling. One sees that the performance of a JPSAM signal detector improves when the power of the specular component in the fading channel increases or the normalized Doppler shift in the fading channel decreases. For example, when the BER=$10^{-2}$ and $f_DT$=0.03, the performance of a JPSAM signal detector for $R_K$=8 is about 8.8 dB better than that for $R_K$=0, and about 2.2 dB better than that for $R_K$=4. When the BER=$10^{-2}$ and $R_K$=0, the performance of a JPSAM signal detector for $f_DT$=0.03 is about 0.6 dB better than that for $f_DT$=0.06, and about 2.6 dB better than that for $f_DT$=0.09. This is expected, as a larger power in the specular component gives a better fading channel condition, and a smaller value of the normalized Doppler shift allows a more accurate channel gain estimate, which results in fewer errors in the data decisions.

Comparing the performance of a JPSAM signal detector with that of the CPSAM signal detector, one sees that the JPSAM signal detector has a performance gain over the conventional detector. The performance gain decreases when the power of the specular component in the channel decreases or the normalized Doppler shift in the channel decreases. As an example, when the BER=$10^{-2}$ and $f_DT$=0.03, a JPSAM signal detector has a performance gain of about 1.5 dB for $R_K$=8, a performance gain of about 1.0 dB for $R_K$=4, and no performance gain for $R_K$=0. When the BER=$10^{-2}$ and $R_K$=8, a JPSAM signal detector has a performance gain of about 3.2 dB for $f_DT$=0.09, about 2.4 dB for $f_DT$=0.06, and about 1.5 dB for $f_DT$=0.03. Observe that the performance gain decreases as $\gamma_b$ increases. This is explained as follows. Comparing (35) with (43), one sees that the performance gain of a JPSAM signal detector for BPSK signaling comes from the fact that an additional offset, $\sigma_n^2 Y_k$, is being used to calculate the channel gain estimate. When the power of the specular component in the channel or the normalized Doppler shift in the channel decrease, or the SNR increases, $Y_k$ or $\sigma_n^2$ will become relatively smaller, and the offset will become less significant. Then, the performance gain decreases.

FIGS. 8 to 10 show the performances of example JPSAM signal detectors for 16-QAM signaling. Again, the performance of a JPSAM signal detector improves when the power of the specular component in the fading channel increases or the normalized Doppler shift in the fading channel decreases. At SER=$10^2$ and $f_DT$=0.03, a JPSAM signal detector for $R_K$=8 is about 10.0 dB better than that for $R_K$=0, and about 2.6 dB better than that for $R_K$=4. At SER=$10^{-2}$ and $R_K$=0, a JPSAM signal detector for $f_DT$=0.03 is about 0.4 dB better than that for $f_DT$=0.06, and about 0.8 dB better than that for $f_DT$=0.09.

Comparing the performance of a JPSAM signal detector with that of the conventional detector, one sees that the optimum detector outperforms the conventional detector. When the SER=$10^{-1}$ and $f_DT$=0.06, a JPSAM signal detector has performance gains of about 1.0 dB for $R_K$=8, about 0.2 dB for $R_K$=4, and approximately 0 dB for $R_K$=0. When the SER=$10^{-1}$ and $R_K$=8, a JPSAM signal detector has a performance gain of about 1.2 dB for $f_DT$=0.09, about 1.0 dB for $f_DT$=0.06, and about 0.6 dB for $f_DT$=0.03. Again, the performance gain decreases as the SNR increases.

Note that the performance gains of a JPSAM signal detector over the conventional detector for 16-QAM signaling are smaller than the corresponding performance gains for BPSK signaling. Note further that a JPSAM signal detector uses $m_R$ and $m_I$, or equivalently, $P^2$, as well as knowledge of $2\sigma_u^2$, as can be seen from (35) and (40), while the CPSAM signal detector only uses $2\sigma_u^2$. Both $2\sigma_u^2$ and $P^2$ can be accurately estimated using estimators developed in [9].

Furthermore, the performance of a JPSAM signal detector is not sensitive to errors in estimation of $P^2$. As an example, FIG. 11 shows the performance of a JPSAM signal detector in the Rician fading channel when estimates of $P^2$ with different accuracies are used for $f_DT$=0.09, $R_K$=8 and BPSK signaling. One sees that the performance of a JPSAM signal detector using an estimate with bias −10% of $P^2$ is almost identical to that using the true value of $P^2$. When an estimate with bias −90% of $P^2$ is used, the performance loss due to the estimation errors in the estimation of $P^2$ is only about 0.3 dB at BER=$10^{-2}$. Further, it can be proved from (35) that a JPSAM signal detector and the CPSAM signal detector will have identical performance if zero is used as the estimate of $P^2$.

Thus, almost the full performance gain of a JPSAM signal detector over the CPSAM signal detector will be realizable in practical implementations. Tables I and II show the performance gains in SNR of JPSAM over CPSAM for BPSK and 16-QAM, respectively. For BPSK signaling the gain ranges from 0 dB for Rayleigh fading to 4.3 dB for Rician fading with $f_DT$=0.09 and $R_K$=8 at an error rate of $10^{-1}$. The gains are smaller for smaller values of error rate. For example, for the same values of $f_DT$ and $R_K$, the gain at 104 error rate is 2.1 dB. Observe that JPSAM has the desirable property that its gains over CPSAM are greatest at larger error rates, where the gains are most needed. The gains are smaller, however, for higher order modulations. Again, when $f_DT$=0.09 and $R_K$=8, the gain is 1.2 dB and 0.0 dB for $10^{-1}$ and $10^{-4}$ error rate, respectively. The gain for BPSK signaling comes from the use of $P^2$, while the gain for 16-QAM signaling comes from the use of $P^2$ as well as the joint processing of data and pilot symbols.

TABLE I

Performance Gains of JPSAM over CPSAM for BPSK Signaling

| Fading Conditions ($f_DT$, $R_K$) | BER = $10^{-1}$ (dB) | BER = $10^{-2}$ (dB) | BER = $10^{-3}$ (dB) | BER = $10^{-4}$ (dB) |
|---|---|---|---|---|
| $f_DT$ = 0.03, $R_K$ = 0 | 0.0 | 0.0 | 0.0 | 0.0 |
| $f_DT$ = 0.03, $R_K$ = 4 | 2.1 | 1.0 | 0.4 | 0.0 |
| $f_DT$ = 0.03, $R_K$ = 8 | 2.5 | 1.5 | 1.2 | 0.9 |
| $f_DT$ = 0.06, $R_K$ = 0 | 0.0 | 0.0 | 0.0 | 0.0 |
| $f_DT$ = 0.06, $R_K$ = 4 | 2.7 | 1.6 | 0.8 | 0.0 |
| $f_DT$ = 0.06, $R_K$ = 8 | 3.2 | 2.4 | 1.9 | 1.7 |
| $f_DT$ = 0.09, $R_K$ = 0 | 0.0 | 0.0 | 0.0 | 0.0 |
| $f_DT$ = 0.09, $R_K$ = 4 | 3.7 | 2.3 | 0.8 | 0.0 |
| $f_DT$ = 0.09, $R_K$ = 8 | 4.3 | 3.2 | 2.9 | 2.1 |

TABLE II

Performance Gains of JPSAM over CPSAM for 16-QAM Signaling

| Fading Conditions ($f_DT$, $R_K$) | SER = $10^{-1}$ (dB) | SER = $10^{-2}$ (dB) | SER = $10^{-3}$ (dB) | SER = $10^{-4}$ (dB) |
|---|---|---|---|---|
| $f_DT$ = 0.03, $R_K$ = 0 | 0.0 | 0.0 | 0.0 | 0.0 |

TABLE II-continued

Performance Gains of JPSAM over CPSAM for 16-QAM Signaling

| Fading Conditions ($f_DT$, $R_K$) | SER = $10^{-1}$ (dB) | SER = $10^{-2}$ (dB) | SER = $10^{-3}$ (dB) | SER = $10^{-4}$ (dB) |
|---|---|---|---|---|
| $f_DT$ = 0.03, $R_K$ = 4 | 0.1 | 0.0 | 0.0 | 0.0 |
| $f_DT$ = 0.03, $R_K$ = 8 | 0.6 | 0.2 | 0.0 | 0.0 |
| $f_DT$ = 0.06, $R_K$ = 0 | 0.0 | 0.0 | 0.0 | 0.0 |
| $f_DT$ = 0.06, $R_K$ = 4 | 0.2 | 0.0 | 0.0 | 0.0 |
| $f_DT$ = 0.06, $R_K$ = 8 | 1.0 | 0.3 | 0.1 | 0.0 |
| $f_DT$ = 0.09, $R_K$ = 0 | 0.0 | 0.0 | 0.0 | 0.0 |
| $f_DT$ = 0.09, $R_K$ = 4 | 0.4 | 0.0 | 0.0 | 0.0 |
| $f_DT$ = 0.09, $R_K$ = 8 | 1.2 | 0.4 | 0.2 | 0.0 |

What has been described is merely illustrative of the application of principles of embodiments of the invention. Other arrangements and methods can be implemented by those skilled in the art without departing from the scope of the present invention.

For example, although described above primarily in the context of Rayleigh and Rician fading processes, embodiments of the invention may be applied to other fading processes. Based on the present disclosure, one skilled in the art would be enabled to adapt embodiments of the invention for use in conjunction with different fading process assumptions.

In addition, the performance plots of FIGS. 5-11 correspond to particular test or simulation conditions. Actual performance of embodiments of the invention may be similar or different for other conditions.

APPENDIX A

Derivation of (17) and (31)

In this Appendix, (17) and (31) are derived. By using (13) and (15) in (14), one has $$f(r_k, p \mid b_k) = \frac{\exp\left(-\frac{|r_k|^2}{2\sigma_n^2} - \frac{\sum_{i=(I)}^{J} |p_i|^2}{2\sigma_n^2}\right)}{(4\pi^2\sigma_n^2)^{J+1}|H_k|} \int\int e^{-\frac{1}{2}u_R F_k u_R^T - \frac{1}{2}u_I F_k u_I^T + \alpha u_R^T + \beta u_I^T} du_k dv \quad (46)$$

where $F_k$, $u_R$, $u_I$, $\alpha$ and $\beta$ are defined as before. Using the fact that $H_k$, $F_k$ and their inverse matrices are symmetric, it can be shown that $$-\frac{1}{2}u_R F_k u_R^T + \alpha u_R^T = -\frac{1}{2}u'_R F_k u'^T_R + \frac{1}{2}\alpha F_k^{-1}\alpha^T \quad (47)$$

and $$-\frac{1}{2}u_I F_k u_I^T + \beta u_I^T = -\frac{1}{2}u'_I F_k u'^T_I + \frac{1}{2}\beta F_k^{-1}\beta^T \quad (48)$$

where $u'_R = u_R - \alpha F_k^{-1}$ and $u'_I = u_I - \beta F_k^{-1}$. Putting (47) and (48) in (46) and executing a transformation of variables, one can obtain $$f(r_k, p \mid b_k) = \frac{\exp\left(-\frac{|r_k|^2}{2\sigma_n^2} - \frac{\sum_{i=(I)}^{(J)} |p_i|^2}{2\sigma_n^2} + \frac{1}{2}\alpha F_k^{-1}\alpha^T + \frac{1}{2}\beta F_k^{-1}\beta^T\right)}{(4\pi^2\sigma_n^2)^{J+1}|H_k|} \quad (49)$$

$$\int\int e^{-\frac{1}{2}u'_R F_k u'^T_R - \frac{1}{2}u'_I F_k u'^T_I} du'_R du'_I$$

Note that the random variables, $u'_R$ and $u'_I$, are Gaussian since $u_R$ and $u_I$ are jointly Gaussian and the transformations are linear. Therefore, they satisfy [6, eqn. (7.4.3)]

$$\int e^{-\frac{1}{2}u'_R F_k u'^T_R} du'_R = \int e^{-\frac{1}{2}u'_I F_k u'^T_I} du'_I = \frac{(2\pi)^{\frac{J+1}{2}}}{|F_k|^{\frac{1}{2}}}. \quad (50)$$

Substituting (50) in (49), and after doing some mathematical manipulations, (17) can be obtained. Equation (31) can be derived in a similar way.

APPENDIX B

Derivation of $S_k$ and $Q_k$

Here, the expressions for $S_k$ in (20) and $Q_k$ in (34) are derived. Since $F_k = H_k^{-1} + G_k$, by using [7, eqn. (5.32)], one has $$F_k^{-1} = H_k - H_k(G_k^{-1} + H_k)^{-1}H_k. \quad (51)$$

It can be shown that $$G_k^{-1} + H_k = \begin{bmatrix} \frac{\sigma_n^2}{|b_k|^2} + E_p^2\sigma_u^2 & w_k \\ w_k^T & \frac{\sigma_n^2}{|b|^2}E + C_k \end{bmatrix}. \quad (52)$$

Therefore, the inverse of $G_k^{-1} + H_k$ is obtained from (52) as [7, eq. (1.35)]

$$(G_k^{-1} + H_k)^{-1} = \begin{bmatrix} \frac{|b_k|^2}{\sigma_n^2 + E_p^2\sigma_u^2|b_k|^2}\left(1 + \frac{|b_k|^2 w_k Z_1 w_k^T}{\sigma_n^2 + E_p^2\sigma_u^2|b_k|^2}\right) & -\frac{|b_k|^2 w_k Z_1}{\sigma_n^2 + E_p^2\sigma_u^2|b_k|^2} \\ -\frac{|b_k|^2 Z_1 w_k^T}{\sigma_n^2 + E_p^2\sigma_u^2|b_k|^2} & Z_1 \end{bmatrix} \quad (53)$$

where $Z_1$ is defined as before. Substituting (16) and (53) into (51) and performing the matrix multiplication, one has $$F_k^{-1} = \begin{bmatrix} \dfrac{E_p^2 \sigma_u^2 \sigma_n^2}{\sigma_n^2 + E_p^2 \sigma_u^2 |b_k|^2} - \dfrac{\sigma_n^4 w_k Z_1 w_k^T}{(\sigma_n^2 + E_p^2 \sigma_u^2 |b_k|^2)^2} & \dfrac{\sigma_n^2 (w_k - w_k Z_1 C_k)}{\sigma_n^2 + E_p^2 \sigma_u^2 |b_k|^2} + \dfrac{\sigma_n^2 |b_k|^2 w_k Z_1 w_k^T w_k}{(\sigma_n^2 + E_p^2 \sigma_u^2 |b_k|^2)^2} \\ \dfrac{\sigma_n^2 (w_k^T - C_k Z_1 w_k^T)}{\sigma_n^2 + E_p^2 \sigma_u^2 |b_k|^2} + \dfrac{\sigma_n^2 |b_k|^2 w_k Z_1 w_k^T w_k^T}{(\sigma_n^2 + E_p^2 \sigma_u^2 |b_k|^2)^2} & Z_3 \end{bmatrix} \quad (54)$$

where $$Z_3 = C_k - \dfrac{|b_k|^2 w_k^T w_k}{\sigma_n^2 + E_p^2 \sigma_u^2 |b_k|^2} \left(1 + \dfrac{|b_k|^2 w_k Z_1 w_k^T}{\sigma_n^2 + E_p^2 \sigma_u^2 |b_k|^2}\right) +$$

$$\dfrac{|b_k|^2 (C_k Z_1 w_k^T w_k + w_k^T w_k Z_1 C_k)}{\sigma_n^2 + E_p^2 \sigma_u^2 |b_k|^2} - C_k Z_1 C_k.$$

Since $S_k$ is the first row of $F_k^{-1}$ excluding the first element, (20) can be obtained from (54). Also, one has $$F_k H_k = \begin{bmatrix} \dfrac{E_p^2 \sigma_u^2 |b_k|^2}{\sigma_n^2} + 1 & \dfrac{|b_k|^2}{\sigma_n^2} w_k \\ \dfrac{|b_k|^2}{\sigma_n^2} w_k^T & \dfrac{|b_k|^2}{\sigma_n^2} C_k + E \end{bmatrix}.$$

The inverse of $F_k H_k$ can be obtained by using [7, eq. (1.35)]. This gives $$(F_k H_k)^{-1} = \quad (55)$$

$$\begin{bmatrix} \dfrac{\sigma_n^2}{\sigma_n^2 + E_p^2 \sigma_u^2 |b_k|^2} \left(1 + \dfrac{|b_k|^2 |\tilde{b}|^2 w_k Z_4 w_k^T}{\sigma_n^2 (\sigma_n^2 + E_p^2 \sigma_u^2 |b_k|^2)}\right) & -\dfrac{|b_k|^2 w_k Z_4}{\sigma_n^2 + E_p^2 \sigma_u^2 |b_k|^2} \\ -\dfrac{|b_k|^2 Z_4 w_k^T}{\sigma_n^2 + E_p^2 \sigma_u^2 |b_k|^2} & Z_4 \end{bmatrix}$$

where $$Z_4 = \dfrac{\sigma_n^2}{|\tilde{b}|^2} Z_1$$

and $Z_1$ is defined as before. Finally, since $Q_k$ is the transpose of the first column of $(F_k H_k)^{-1}$, one can obtain (34) from (55).

APPENDIX C

Analysis of (25) and (44)

The equivalence between (25) and (44) is proven here. Denote $$R_k = \left(1 + \dfrac{|b_k|^2 w_k Z_1 w_k^T}{\sigma_n^2 + E_p^2 \sigma_u^2 |b_k|^2}\right) E - Z_1 C_k. \quad (56)$$

From (20), (42), (25) and (44), it is enough to show that $$w_k R_k^T w_k^T = \sqrt{w_k (|\tilde{b}|^2 C_k + \sigma_n^2 E)^{-1} w_k^T w_k R_k (|\tilde{b}|^2 C_k + \sigma_n^2 E) R_k^T w_k^T}. \quad (57)$$

Using (21) and [7, eq. (5.32)], one has $$w_k^T w_k Z_1 (|\tilde{b}|^2 C_k + \sigma_n^2 E) = |\tilde{b}|^2 \left(1 + \dfrac{|b_k|^2 w_k Z_1 w_k^T}{\sigma_n^2 + E_p^2 \sigma_u^2 |b_k|^2}\right) w_k^T w_k. \quad (58)$$

This in turn gives $$w_k^T w_k Z_1 (|\tilde{b}|^2 C_k + \sigma_n^2 E) C_k - |\tilde{b}|^2 \left(1 + \dfrac{|b_k|^2 w_k Z_1 w_k^T}{\sigma_n^2 + E_p^2 \sigma_u^2 |b_k|^2}\right) w_k^T w_k C_k = 0 \quad (59)$$

$$C_k (|\tilde{b}|^2 C_k + \sigma_n^2 E) Z_1 w_k^T w_k - |\tilde{b}|^2 \left(1 + \dfrac{|b_k|^2 w_k Z_1 w_k^T}{\sigma_n^2 + E_p^2 \sigma_u^2 |b_k|^2}\right) C_k w_k^T w_k = 0$$

where 0 is a J×J zero matrix. From (59), it is easy to verify that $$w_k^T w_k \left[\left(1 + \dfrac{|b_k|^2 w_k Z_1 w_k^T}{\sigma_n^2 + E_p^2 \sigma_u^2 |b_k|^2}\right)(|\tilde{b}|^2 C_k + \sigma_n^2 E) - Z_1(|\tilde{b}|^2 C_k + \sigma_n^2 E) C_k\right] = \quad (60)$$

$$\left[\left(1 + \dfrac{|b_k|^2 w_k Z_1 w_k^T}{\sigma_n^2 + E_p^2 \sigma_u^2 |b_k|^2}\right)(|\tilde{b}|^2 C_k + \sigma_n^2 E) - C_k(|\tilde{b}|^2 C_k + \sigma_n^2 E) Z_1\right] w_k^T w_k.$$

Since $(|\tilde{b}|^2 C_k + \sigma_n^2 E) C_k = C_k (|\tilde{b}|^2 C_k + \sigma_n^2 E)$, from (60), one further has $$w_k^T w_k R_k (|\tilde{b}|^2 C_k + \sigma_n^2 E) = (|\tilde{b}|^2 C_k + \sigma_n^2 E) R_k^T w_k^T w_k \quad (61)$$

where $R_k$ is given by (56). Multiplying both sides of (61) with $w_k (|\tilde{b}|^2 C_k + \sigma_n^2)^{-1}$ on the left and $R_k^T w_k^T$ on the right, one has $$w_k (|\tilde{b}|^2 C_k + \sigma_n^2 E)^{-1} w_k^T w_k R_k (|\tilde{b}|^2 C_k + \sigma_n^2 E) R_k^T w_k^T = w_k R_k^T w_k^T w_k R_k^T w_k^T. \quad (62)$$

From (62), (57) can be obtained.

REFERENCES

[1] J. G. Proakis, Digital Communications, 4th ed. New York: McGraw-Hill, 2001.
[2] J. K. Cavers, "An analysis of pilot symbol assisted modulation for Rayleigh fading channels," IEEE Trans. Vehicul. Technol., vol. 40, pp. 686-693, November 1991.
[3] S. Sampei and T. Sunaga, "Rayleigh fading compensation for QAM in land mobile radio communications," IEEE Trans. Vehicul. Technol., vol. 42, pp. 137-147, May 1993.
[4] H. Li, Y. Iwanami, and T. Ikeda, "Symbol error rate analysis for MPSK under Rician fading channels with fading compensation based on time correlation," IEEE Trans. Vehicul. Technol., Vol. 44, pp. 535-542, August 1995.
[5] G. L. Stüber, Principles of Mobile Communication, 2nd ed. Norwell, Mass.: Kluwer Academic, 2001.
[6] S. S. Wilks, Mathematical Statistics, New York: John Wiley & Sons, 1962.
[7] B. Noble, Applied Linear Algebra, Engle Cliff, N.J.: Prentice-Hall, 1969.
[8] H. L. Van Trees, Detection, Estimation, and Modulation Theory, Part I. New York: Wiley, 2001.
[9] Y. Chen and N. C. Beaulieu, "Estimators using noisy channel samples for fading distribution parameters," submitted.

The invention claimed is:

1. An apparatus comprising:
an input for receiving from a communication channel a communication signal containing unknown data symbols and known pilot symbols; and
a communication signal processing module operatively coupled to the input and configured to determine a transmitted value of a received data symbol based on at least one pilot symbol in the received communication signal, a received value of at least one data symbol, and a likelihood function, the likelihood function taking into account an assumption of a fading process on the communication channel and a specular component of the fading process, wherein the communication signal processing module is configured to determine the transmitted value of the received data symbol by:
computing a respective intermediate value for each of a plurality of possible transmitted values of the received data symbol, wherein each intermediate value is representative of an estimate of a gain of the communication channel;
determining a respective likelihood value for each possible transmitted value of the received data symbol, the respective likelihood values being a function of the received value of the data symbol and the respective intermediate values; and
selecting as a channel gain estimate for the received data symbol a channel gain estimate associated with a highest of the respective likelihood values.

2. The apparatus of claim 1, further comprising:
an output operatively coupled to the communication signal processing module,
wherein the communication signal processing module is further configured to provide at an output at least one of the determined transmitted value of the received data symbol and the channel gain estimate for the received data symbol.

3. The apparatus of claim 2, further comprising:
a plurality of antennas for receiving diversity components of the communication signal; and
a diversity combiner operatively coupled to the plurality of antennas and to the input, and configured to combine the received diversity components to generate the received communication signal.

4. The apparatus of claim 3, wherein the communication signal processing module is configured to provide at the output the channel gain estimate for the received data symbol, and wherein the diversity combiner is further operatively coupled to the output and configured to use the channel gain estimate in combining other received diversity components.

5. The apparatus of claim 1, wherein the fading process is a Rician fading process, wherein the likelihood function comprises:

$$f(r_k,p|b_k) = \iiint f(r_k,p|u_k,v,b_k) \cdot f(u_k,v) du_k dv$$

where
$f(\cdot)$ is a joint Probability Density Function (PDF);
$r_k$ is the received value of the data symbol;
p comprises received values of pilot symbols in the received communication signal;
$u_k$ is a complex channel gain for the data symbol in the received communication signal;
v comprises complex channel gains for the pilot symbols in the received communication signal; and
$b_k$ is the data symbol for which a value is to be determined, wherein the data symbol has one of a plurality of possible values having equal energies, and wherein the communication signal processing module is configured to determine a transmitted value of a received data symbol based on:

$$\hat{b}_k = \arg \max_{b_k \in \{b_m\}_{m=1}^M} \{\text{Re}\{r_k b_k^* V_k^*\}\}$$

where $$V_k = X_k + \sigma_n^2 Y_k;$$

$$X_k = \tilde{b}^* p S_k^T;$$

$\tilde{b}$ is a known value of the pilot symbols;

$$S_k = w_k \cdot \left[ \left( \frac{\sigma_n^2}{\sigma_n^2 + E_p^2 \sigma_u^2 |b_k|^2} + \frac{\sigma_n^2 |b_k|^2 w_k Z_1 w_k^T}{(\sigma_n^2 + E_p^2 \sigma_u^2 |b_k|^2)^2} \right) E - \frac{\sigma_n^2 Z_1 C_k}{\sigma_n^2 + E_p^2 \sigma_u^2 |b_k|^2} \right];$$

$\sigma_n^2$ is a variance of noise on the communication channel;
$E_p$ is the energy of a shaping pulse;
$\sigma_u^2$ is a variance of channel gain u of the communication channel;
$w_k$ is a covariance between real or imaginary components of $u_k$ and $v_i$;

$$Z_1 = \left[ C_k + \frac{\sigma_n^2}{|\tilde{b}|^2} E - \frac{|b_k|^2}{\sigma_n^2 + E_p^2 \sigma_u^2 |b_k|^2} w_k^T w_k \right]^{-1};$$

E is an identity matrix;
$C_k$ is a covariance between real or imaginary components of v;

$$Y_k = (m_R + jm_I) Q_k^T;$$

$m_R + jm_I$ is a mean of the channel gain u of the communication channel; and $$Q_k = \left[ \frac{\sigma_n^2}{\sigma_n^2 + E_p^2 \sigma_u^2 |b_k|^2} \left( 1 + \frac{|b_k|^2 w_k Z_1 w_k^T}{\sigma_n^2 + E_p^2 \sigma_u^2 |b_k|^2} \right) - \frac{\sigma_n^2}{\sigma_n^2 + E_p^2 \sigma_u^2 |b_k|^2} w_k Z_1 \right].$$

6. The apparatus of claim 1, wherein the fading process is a Rician fading process, wherein the likelihood function comprises:

$$f(r_k,p|b_k) = \iiint f(r_k,p|u_k,v,b_k) \cdot f(u_k,v) du_k dv$$

where
- $f(\cdot)$ is a joint Probability Density Function (PDF);
- $r_k$ is the received value of the data symbol in the received communication signal;
- p comprises received values of pilot symbols in the received communication signal;
- $u_k$ is a complex channel gain for the data symbol in the received communication signal;
- v comprises complex channel gains for the pilot symbols in the received communication signal; and
- $b_k$ is the data symbol for which a value is to be determined, wherein the data symbol has one of a plurality of possible values having unequal energies, and wherein the communication signal processing module is configured to determine a transmitted value of a received data symbol based on $$\hat{b}_k = \arg\max_{b_k \in \{b_m\}_{m=1}^M} \left\{ \operatorname{Re}\{r_k b_k^* V_k^*\} - \sigma_n^4 \ln\left|\frac{|b_k|^2}{\sigma_n^2} + d\right| + \sigma_n^4 A_k + \sigma_n^4 B_k \right\}.$$

where $$V_k = X_k + \sigma_n^2 Y_k;$$

$$X_k = \tilde{b}^* p S_k^T;$$

$\tilde{b}$ is a known value of the pilot symbols;

$$S_k = w_k \cdot \left[ \left( \frac{\sigma_n^2}{\sigma_n^2 + E_p^2 \sigma_u^2 |b_k|^2} + \frac{\sigma_n^2 |b_k|^2 w_k Z_1 w_k^T}{(\sigma_n^2 + E_p^2 \sigma_u^2 |b_k|^2)^2} \right) E - \frac{\sigma_n^2 Z_1 C_k}{\sigma_n^2 + E_p^2 \sigma_u^2 |b_k|^2} \right];$$

- $\sigma_n^2$ is a variance of noise on the communication channel;
- $E_p$ is the energy of a shaping pulse;
- $\sigma_u^2$ is a variance of channel gain u of the communication channel;
- $w_k$ is a covariance between real or imaginary components of $u_k$ and $v_i$;

$$Z_1 = \left[ C_k + \frac{\sigma_n^2}{|\tilde{b}|^2} E - \frac{|b_k|^2}{\sigma_n^2 + E_p^2 \sigma_u^2 |b_k|^2} w_k^T w_k \right]^{-1};$$

- E is an identity matrix;
- $C_k$ is a covariance between real or imaginary components of v;

$$Y_k = (m_R + jm_I) Q_k^T;$$

$m_R + jm_I$ is a mean of the channel gain u of the communication channel;

$$Q_k = \left[ \frac{\sigma_n^2}{\sigma_n^2 + E_p^2 \sigma_u^2 |b_k|^2} \left( 1 + \frac{|b_k|^2 w_k Z_1 w_k^T}{\sigma_n^2 + E_p^2 \sigma_u^2 |b_k|^2} \right) - \frac{\sigma_n^2}{\sigma_n^2 + E_p^2 \sigma_u^2 |b_k|^2} w_k Z_1 \right];$$

$$d = \frac{1}{E_p^2 \sigma_u^2} + \frac{1}{E_p^4 \sigma_u^4} w_k Z_2 \left( \frac{\sigma_n^2}{|\tilde{b}|^2} Z_2 + E \right)^{-1} w_k^T;$$

$$Z_2 = \left[ C_k - \frac{1}{E_p^2 \sigma_u^2} w_k^T w_k \right]^{-1};$$

$A_k$ is a bias term caused by the unequal energies of the possible values of the data symbol; and $B_k$ is a bias term caused by the unequal energies of the possible values of the data symbol and the specular component.

7. A communication signal receiver comprising the apparatus of claim 1.

8. A method performed by an apparatus in a communication signal receiver, the method comprising:
- receiving from a communication channel a communication signal containing unknown data symbols and known pilot symbols; and
- determining a transmitted value of a received data symbol based on at least one pilot symbol in the received communication signal, a received value of at least one data symbol, and a likelihood function, the likelihood function taking into account an assumption of a fading process on the communication channel and a specular component of the fading process, wherein determining the transmitted value of the received data symbol comprises:
  - computing a respective intermediate value for each of a plurality of possible transmitted values of the received data symbol, wherein each intermediate value is representative of an estimate of a gain of the communication channel;
  - determining a respective likelihood value for each possible transmitted value of the received data symbol, the respective likelihood values being a function of the received value of the data symbol and the respective intermediate values; and
  - selecting as a channel gain estimate for the received data symbol a channel gain estimate associated with a highest of the respective likelihood values.

9. The method of claim 8, further comprising:
using an intermediate value computed for a received data symbol in performing a function for another received communication signal.

10. The method of claim 9, wherein receiving comprises receiving a plurality of diversity components of the communication signal and combining the received diversity components to generate the received communication signal, and wherein using comprises using the intermediate value in combining other received diversity components.

11. The method of claim 8, wherein the fading process is a Rician fading process, wherein the likelihood function comprises:

$$f(r_k, p | b_k) = \iiint f(r_k, p | u_k, v, b_k) \cdot f(u_k, v) du_k dv$$

where
- $f(\cdot)$ is a joint Probability Density Function (PDF);
- $r_k$ is the received value of the data symbol;
- p comprises received values of pilot symbols in the received communication signal;
- $u_k$ is a complex channel gain for the data symbol in the received communication signal;
- v comprises complex channel gains for the pilot symbols in the received communication signal; and
- $b_k$ is the data symbol for which a value is to be determined, wherein the data symbol has one of a plurality of possible values having equal energies, and wherein determining comprises determining a transmitted value of a received data symbol based on:

$$\hat{b}_k = \arg\max_{b_k \in \{b_m\}_{m=1}^M} \{\operatorname{Re}\{r_k b_k^* V_k^*\}\}$$

where $V_k = X_k + \sigma_n^2 Y_k$;

$X_k = \tilde{b}*pS_k^T$;

$\tilde{b}$ is a known value of the pilot symbols;

$$S_k = w_k \cdot \left[\left(\frac{\sigma_n^2}{\sigma_n^2 + E_p^2\sigma_u^2|b_k|^2} + \frac{\sigma_n^2|b_k|^2 w_k Z_1 w_k^T}{(\sigma_n^2 + E_p^2\sigma_u^2|b_k|^2)^2}\right)E - \frac{\sigma_n^2 Z_1 C_k}{\sigma_n^2 + E_p^2\sigma_u^2|b_k|^2}\right];$$

$\sigma_n^2$ is a variance of noise on the communication channel;
$E_p$ is the energy of a shaping pulse;
$\sigma_u^2$ is a variance of channel gain u of the communication channel;
$w_k$ is a covariance between real or imaginary components of $u_k$ and $v_i$;

$$Z_1 = \left[C_k + \frac{\sigma_n^2}{|\tilde{b}|^2}E - \frac{|b_k|^2}{\sigma_n^2 + E_p^2\sigma_u^2|b_k|^2}w_k^T w_k\right]^{-1};$$

E is an identity matrix;
$C_k$ is a covariance between real or imaginary components of v;

$Y_k = (m_R j M_I)Q_k^T$;

$m_R + jm_I$ is a mean of the channel gain u of the communication channel; and $$Q_k = \left[\frac{\sigma_n^2}{\sigma_n^2 + E_p^2\sigma_u^2|b_k|^2}\left(1 + \frac{|b_k|^2 w_k Z_1 w_k^T}{\sigma_n^2 + E_p^2\sigma_u^2|b_k|^2}\right) - \frac{\sigma_n^2}{\sigma_n^2 + E_p^2\sigma_u^2|b_k|^2}w_k Z_1\right].$$

12. The method of claim 8, wherein the fading process is a Rician fading process, wherein the likelihood function comprises:

$f(r_k,p|b_k) = \iint f(r_k,p|u_k,v,b_k) \cdot f(u_k,v) du_k dv$ where
$f(\cdot)$ is a joint Probability Density Function (PDF);
$r_k$ is the received value of the data symbol;
p comprises received values of pilot symbols in the received communication signal;
$u_k$ is a complex channel gain for the data symbol in the received communication signal;
v comprises complex channel gains for the pilot symbols in the received communication signal; and
$b_k$ is the data symbol for which a value is to be determined,
wherein the data symbol has one of a plurality of possible values having unequal energies, and determining comprises determining a transmitted value of a received data symbol based on:

$$\hat{b}_k = \arg\max_{b_k \in \{b_m\}_{m=1}^M} \left\{Re\{r_k b_k^* V_k^*\} - \sigma_n^4 \ln\left|\frac{|b_k|^2}{\sigma_n^2} + d\right| + \sigma_n^4 A_k + \sigma_n^4 B_k\right\}$$

where $V_k = X_k + \sigma_n^2 Y_k$;

$X_k = \tilde{b}*pS_k^T$;

$\tilde{b}$ is a known value of the pilot symbols;

$$S_k = w_k \cdot \left[\left(\frac{\sigma_n^2}{\sigma_n^2 + E_p^2\sigma_u^2|b_k|^2} + \frac{\sigma_n^2|b_k|^2 w_k Z_1 w_k^T}{(\sigma_n^2 + E_p^2\sigma_u^2|b_k|^2)^2}\right)E - \frac{\sigma_n^2 Z_1 C_k}{\sigma_n^2 + E_p^2\sigma_u^2|b_k|^2}\right];$$

$\sigma_n^2$ is a variance of noise on the communication channel;
$E_p$ is the energy of a shaping pulse;
$\sigma_u^2$ is a variance of channel gain u of the communication channel;
$w_k$ is a covariance between real or imaginary components of $u_k$ and $v_i$;

$$Z_1 = \left[C_k + \frac{\sigma_n^2}{|\tilde{b}|^2}E - \frac{|b_k|^2}{\sigma_n^2 + E_p^2\sigma_u^2|b_k|^2}w_k^T w_k\right]^{-1};$$

E is an identity matrix;
$C_k$ is a covariance between real or imaginary components of v;

$Y_k = (m_R + jm_I)Q_k^T$;

$m_R + jm_I$ is a mean of the channel gain u of the communication channel;

$$Q_k = \left[\frac{\sigma_n^2}{\sigma_n^2 + E_p^2\sigma_u^2|b_k|^2}\left(1 + \frac{|b_k|^2 w_k Z_1 w_k^T}{\sigma_n^2 + E_p^2\sigma_u^2|b_k|^2}\right) - \frac{\sigma_n^2}{\sigma_n^2 + E_p^2\sigma_u^2|b_k|^2}w_k Z_1\right];$$

$$d = \frac{1}{E_p^2\sigma_u^2} + \frac{1}{E_p^4\sigma_u^4}w_k Z_2\left(\frac{\sigma_n^2}{|\tilde{b}|^2}Z_2 + E\right)^{-1}w_k^T;$$

$$Z_2 = \left[C_k - \frac{1}{E_p^2\sigma_u^2}w_k^T w_k\right]^{-1};$$

$A_k$ is a bias term caused by the unequal energies of the possible values of the data symbol; and
$B_k$ is a bias term caused by the unequal energies of the possible values of the data symbol and the specular component.

13. A non-transitory computer readable medium having instructions stored thereon executable by one or more processing elements for performing a method according to claim 8.

14. An apparatus comprising:
an input for receiving a communication signal containing unknown data symbols and known pilot symbols; and
a communication signal processing module operatively coupled to the input and configured to determine a transmitted value of an unknown data symbol from possible values of at least one unknown data symbol that maximizes a likelihood function for joint processing of the known pilot symbols and the at least one unknown data symbol in a current symbol period, the likelihood function taking into account an assumption of a fading process and being a function of:

a) a known value of at least one pilot symbol and received samples of at least one pilot symbol; and
b) received samples of the at least one unknown data symbol in the current symbol period and the possible values of the at least one unknown data symbol in the current symbol period;
wherein the fading process is a Rayleigh process, wherein the likelihood function comprises:

$$f(r_k,p|b_k) = \iiint f(r_k,p|u_k,v,b_k) \cdot f(u_k,v) du_k dv,$$

where
$f(\bullet)$ is a joint Probability Density Function (PDF);
$r_k$ is the received sample of the unknown data symbol;
p comprises received values of pilot symbols in the received communication signal;
$u_k$ is a complex channel gain for the unknown data symbol in the received communication signal;
v comprises complex channel gains for the pilot symbols in the received communication signal; and
$b_k$ is the unknown data symbol for which a value is to be determined,
wherein the unknown data symbol has one of a plurality of possible values having equal energies, and wherein the communication signal processing module is configured to determine a transmitted value of the unknown data symbol based on:

$$\hat{b}_k = \arg \max_{b_k \in \{b_m\}_{m=1}^M} \{Re(r_k b_k^* X_k^*)\}$$

where $X_k = \tilde{b}^* p S_k^T;$ $\tilde{b}$ is a known value of the pilot symbols;

$$S_k = w_k \cdot \left[\left(\frac{\sigma_n^2}{\sigma_n^2 + E_p^2 \sigma_u^2 |b_k|^2} + \frac{\sigma_n^2 |b_k|^2 w_k Z_1 w_k^T}{(\sigma_n^2 + E_p^2 \sigma_u^2 |b_k|^2)^2}\right) E - \frac{\sigma_n^2 Z_1 C_k}{\sigma_n^2 + E_p^2 \sigma_u^2 |b_k|^2}\right];$$

$\sigma_n^2$ is a variance of noise on the communication channel;
$E_p$ is the energy of a shaping pulse;
$\sigma_u^2$ is a variance of channel gain u of the communication channel;
$w_k$ is a covariance between real or imaginary components of $u_k$ and $v_i$;

$$Z_1 = \left[C_k + \frac{\sigma_n^2}{|\tilde{b}|^2} E - \frac{|b_k|^2}{\sigma_n^2 + E_p^2 \sigma_u^2 |b_k|^2} w_k^T w_k\right]^{-1};$$

E is an identity matrix; and
$C_k$ is a covariance between real or imaginary components of v.

15. An apparatus comprising:
an input for receiving a communication signal containing unknown data symbols and known pilot symbols; and
a communication signal processing module operatively coupled to the input and configured to determine a transmitted value of an unknown data symbol from possible values of at least one unknown data symbol that maximizes a likelihood function for joint processing of the known pilot symbols and the at least one unknown data symbol in a current symbol period, the likelihood function taking into account an assumption of a fading process and being a function of: a) a known value of at least one pilot symbol and received samples of at least one pilot symbol; and
b) received samples of the at least one unknown data symbol in the current symbol period and the possible values of the at least one unknown data symbol in the current symbol period;
wherein the fading process is a Rayleigh process, wherein the likelihood function comprises:

$$f(r_k,p|b_k) = \iiint f(r_k,p|u_k,v,b_k) \cdot f(u_k,v) du_k dv$$

where
$f(\bullet)$ is a joint Probability Density Function (PDF);
$r_k$ is the received sample of the unknown data symbol;
p comprises received values of pilot symbols in the received communication signal;
$u_k$ is a complex channel gain for the data symbol in the received communication signal;
v comprises complex channel gains for the pilot symbols in the received communication signal; and
$b_k$ is the unknown data symbol for which a value is to be determined,
wherein the data symbol has one of a plurality of possible values having unequal energies, and wherein the communication signal processing module is configured to determine a transmitted value of the unknown data symbol based on:

$$\hat{b}_k = \arg \max_{b_k \in \{b_m\}_{m=1}^M} \left\{Re\{r_k b_k^* X_k^*\} - \sigma_n^4 \ln\left|\frac{|b_k|^2}{\sigma_n^2} + d\right| + \sigma_n^4 A_k\right\}$$

$X_k = \tilde{b}^* p S_k^T;$ $\tilde{b}$ is a known value of the pilot symbols;

$$S_k = w_k \cdot \left[\left(\frac{\sigma_n^2}{\sigma_n^2 + E_p^2 \sigma_u^2 |b_k|^2} + \frac{\sigma_n^2 |b_k|^2 w_k Z_1 w_k^T}{(\sigma_n^2 + E_p^2 \sigma_u^2 |b_k|^2)^2}\right) E - \frac{\sigma_n^2 Z_1 C_k}{\sigma_n^2 + E_p^2 \sigma_u^2 |b_k|^2}\right];$$

$\sigma_n^2$ is a variance of noise on the communication channel;
$E_p$ is the energy of a shaping pulse;
$\sigma_u^2$ is a variance of channel gain u of the communication channel;
$w_k$ is a covariance between real or imaginary components of $u_k$ and $v_i$;

$$Z_1 = \left[C_k + \frac{\sigma_n^2}{|\tilde{b}|^2} E - \frac{|b_k|^2}{\sigma_n^2 + E_p^2 \sigma_u^2 |b_k|^2} w_k^T w_k\right]^{-1};$$

E is an identity matrix;
$C_k$ is a covariance between real or imaginary components of v;

$$d = \frac{1}{E_p^2 \sigma_u^2} + \frac{1}{E_p^4 \sigma_u^4} w_k Z_2 \left(\frac{\sigma_n^2}{|\tilde{b}|^2} Z_2 + E\right)^{-1} w_k^T;$$

$$Z_2 = \left[C_k - \frac{1}{E_p^2 \sigma_u^2} w_k^T w_k\right]^{-1}; \text{ and}$$

$A_k$ is a bias term caused by the unequal energies of the possible values of the data symbol.

* * * * *

UNITED STATES PATENT AND TRADEMARK OFFICE
CERTIFICATE OF CORRECTION

PATENT NO. : 8,654,899 B2
APPLICATION NO. : 11/665188
DATED : February 18, 2014
INVENTOR(S) : Norman C. Beaulieu et al.

It is certified that error appears in the above-identified patent and that said Letters Patent is hereby corrected as shown below:

In the specification:

Column 9, line 30:

| Reads: | Should be: |
|---|---|
| $n(t)$ is also a Gaussian random process. It has mean zero and auto-covariance $\frac{1}{2}E\{n(t)n^*(t+\tau)\} = N_0\delta(\tau)$. | $n(t)$ is also a Gaussian random process. It has mean zero and auto-covariance $\frac{1}{2}E\{n(t)n^*(t+\tau)\} = N_0\delta(\tau)$. |

Column 12, line 29:

| Reads: | Should be: |
|---|---|
| $\mathbf{F}_k = \mathbf{H}_k^{-1} + \mathbf{G}_k$, $\mathbf{G}_k = \frac{1}{\sigma_n^2}\begin{bmatrix} \|b_k\|^2 & \mathbf{0} \\ \mathbf{0} & \|\tilde{b}\|\mathbf{E} \end{bmatrix}$, $\mathbf{0}$ is a $1 \times J$ zero vector, and | $\mathbf{F}_k = \mathbf{H}_k^{-1} + \mathbf{G}_k$, $\mathbf{G}_k = \frac{1}{\sigma_n^2}\begin{bmatrix} \|b_k\|^2 & \mathbf{0} \\ \mathbf{0} & \|\tilde{b}\|\mathbf{E} \end{bmatrix}$, $\mathbf{0}$ is a $1 \times J$ zero vector, and |

Column 18, line 4:

| Reads: | Should be: |
|---|---|
| $\mu_{X'X'} = \|\tilde{b}\|^2 \mathbf{S}_k'(\|\tilde{b}\|^2 \mathbf{C}_k + \sigma_n^2\mathbf{E})\mathbf{S}_k'^T$, and $\rho_1'$ is given in (44). | $\mu_{X'X'} = \|\tilde{b}\|^2 \mathbf{S}_k'(\|\tilde{b}\|^2 \mathbf{C}_k + \sigma_n^2\mathbf{E})\mathbf{S}_k'^T$, and $\rho_1'$ is given in (44). |

Column 21, line 65:

| Reads: | Should be: |
|---|---|
| $-\frac{1}{2}\mathbf{u}_R\mathbf{F}_k\mathbf{u}_R^T + \alpha\mathbf{u}_R^T = -\frac{1}{2}\mathbf{u}'_R\mathbf{F}_k\mathbf{u}'_R^T + \frac{1}{2}\alpha\mathbf{F}_k^{-1}\alpha^T$ (47) and | $-\frac{1}{2}\mathbf{u}_R\mathbf{F}_k\mathbf{u}_R^T + \alpha\mathbf{u}_R^T = -\frac{1}{2}\mathbf{u}'_R\mathbf{F}_k\mathbf{u}'_R^T + \frac{1}{2}\alpha\mathbf{F}_k^{-1}\alpha^T$ (47) and |

Signed and Sealed this
Nineteenth Day of August, 2014

Michelle K. Lee
*Deputy Director of the United States Patent and Trademark Office*

CERTIFICATE OF CORRECTION (continued)
U.S. Pat. No. 8,654,899 B2

In the claims:

Claim 11, Column 29, line 30: " $Y_k = (m_R j M_I) \mathbf{Q}_k^T$ " should read -- $Y_k = (\mathbf{m}_R + j\mathbf{m}_I) \mathbf{Q}_k^T$ --